United States Patent
Miyaoka et al.

(10) Patent No.: US 8,594,206 B2
(45) Date of Patent: Nov. 26, 2013

(54) WIRELESS TRANSMISSION APPARATUS, WIRELESS RECEPTION APPARATUS, WIRELESS COMMUNICATION SYSTEM, AND WIRELESS COMMUNICATION METHOD

(75) Inventors: Hirosada Miyaoka, Chiba (JP); Ma Yugang, Singapore Science Park (SG); Yoshiyuki Akiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 484 days.

(21) Appl. No.: 12/923,940

(22) Filed: Oct. 15, 2010

(65) Prior Publication Data

US 2011/0110439 A1 May 12, 2011

(30) Foreign Application Priority Data

Nov. 11, 2009 (JP) ................................. 2009-258369

(51) Int. Cl.
*H04L 27/00* (2006.01)
(52) U.S. Cl.
USPC .......................................................... 375/259
(58) Field of Classification Search
USPC ......... 375/134, 135, 137, 141, 147, 219, 259, 375/267, 296, 297, 326, 327, 344, 357, 375/376; 455/71, 73, 130, 258, 313, 314
See application file for complete search history.

(56) References Cited

U.S. PATENT DOCUMENTS

| | | | | |
|---|---|---|---|---|
| 4,229,741 A | * | 10/1980 | Groth, Jr. ........................ | 370/294 |
| 5,398,002 A | * | 3/1995 | Bang .............................. | 329/302 |
| 6,898,257 B2 | * | 5/2005 | Fischer et al. ................. | 375/376 |
| 2001/0053192 A1 | * | 12/2001 | Matsu Moto et al. .......... | 375/344 |
| 2003/0078021 A1 | * | 4/2003 | Dale .............................. | 455/260 |
| 2008/0292037 A1 | * | 11/2008 | Fujita et al. .................... | 375/354 |
| 2009/0304129 A1 | * | 12/2009 | Kobayashi ..................... | 375/344 |

FOREIGN PATENT DOCUMENTS

| JP | 2001-053640 | 2/2001 |
|---|---|---|
| JP | 2003-244016 | 8/2003 |

* cited by examiner

*Primary Examiner* — Sam K Ahn
*Assistant Examiner* — Syed Haider
(74) *Attorney, Agent, or Firm* — Rader, Fishman & Grauer PLLC

(57) ABSTRACT

Disclosed herein is a wireless transmission apparatus including: a wireless transmission block having an oscillator for oscillating a signal having a local oscillation frequency, the wireless transmission block being configured to transmit a digital signal on the basis of a signal having a local oscillation frequency oscillated by the oscillator to the reception side.

13 Claims, 24 Drawing Sheets

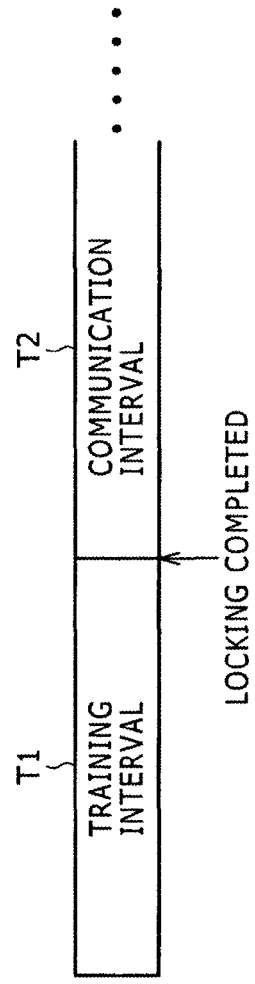
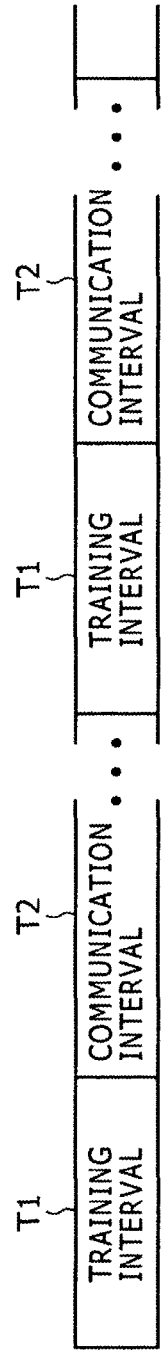
FIG. 17A
FIG. 17B

WIRELESS TRANSMISSION APPARATUS, WIRELESS RECEPTION APPARATUS, WIRELESS COMMUNICATION SYSTEM, AND WIRELESS COMMUNICATION METHOD

BACKGROUND OF THE INVENTION

1. Field of the Invention

The present invention relates to a wireless transmission apparatus, a wireless reception apparatus, a wireless communication system, and a wireless communication method that are applicable to a millimeter-wave transmission system for fast transmitting signals of millimeter band in which carrier frequencies for carrying movie images, computer images, and the like are 30 GHz to 300 GHz in the housing of each apparatus.

2. Description of the Related Art

As the volumes of information such as movie images, computer images and the like have been enormously growing in the recent years, the demands for high-speed and mass-capacity digital communication, irrespective of wired or wireless, have been constantly increasing. In such high-speed, mass-capacity digital communication, use of apparatuses for transmitting modulated signals of millimeter waves for example at high speeds has been growing. The high-speed signal transmission apparatuses of this kind are desired to transmit high-speed modulated signals of millimeter wave for example to the reception side without involving errors.

A wireless communication system for transmitting high-speed wireless modulated signals of millimeter wave is made up of a wireless transmission apparatus and a wireless reception apparatus, for example. The wireless transmission apparatus has a transmission baseband processing block and a wireless transmission block. The transmission baseband processing block processes a digital signal entered from an upper digital data processing block to generate a baseband signal. The wireless transmission block has a local oscillator super-imposes the baseband signal generated by the transmission baseband processing block with the local oscillation signal generated by the local oscillator to generate a wireless modulated signal.

The wireless reception apparatus has a wireless reception block and a received baseband processing block. The wireless reception block has a local oscillator and superimposes a wireless modulated signal received from the transmission side with a local oscillation signal outputted from the local oscillator to generate a baseband signal. The received baseband processing block outputs a digital signal obtained by processing the baseband signal entered from the wireless reception block to an upper digital data processing block. Consequently, large volumes of digital signals can be communicated from the transmission side to the reception side at high speeds.

The local oscillation frequency of a local oscillation signal of each of the wireless transmission apparatus and the wireless reception apparatus is generated by a voltage controlled oscillator (VCO) for example inside each apparatus. This configuration disables both the transmission side and the reception side to generate a local oscillation signal having the exactly the same local oscillation frequency. Therefore, a difference is caused in the local oscillation frequency of each local oscillation signal between the wireless transmission apparatus and the wireless reception apparatus. In order to solve this problem, a local oscillator excellent in frequency stability and low in phase noise is desired. In addition, in order to correct the difference between the local oscillation frequencies, a PLL (Phase Locked Loop) circuit is used.

There is an injection locking method in which the local oscillation frequency of a local oscillation signal is equally pulled in at the transmission side and the reception side mentioned above. This injection locking technique, long known, injects the local oscillation signal having a local oscillation frequency from the wireless transmission apparatus into the wireless reception apparatus, thereby providing the local oscillation frequency locking between the transmission side and the reception side.

For communication apparatuses for transmitting and receiving millimeter waves of this kind, "A Study of Locking Phenomena in Oscillators" (1), ROBERT ADLER, A paper reprinted from the June 1946 issue of the PROCEEDINGS OF THE IRE (hereinafter referred to as Non-patent document 1) and "A Study of Injection Locking and Pulling-in Oscillators" (2), Behzad Razavi, IEEE JOURNAL OF SOLID-STATE CIRCUITS, VOL. 39, NO. 9, SEPTEMBER 2004 (hereinafter referred to as Non-patent document 2) disclose new injection locking methods based on the multiple locking of a millimeter-wave solid oscillator. This millimeter-wave solid-state oscillator has a DC bias circuit, a coaxial circuit, and an oscillator and uses multiple locking for injection locking. In the multiple locking, a signal that is an integral sub-multiple of the main oscillation frequency is externally injected to stabilize an oscillation wave.

In doing so, a DRS (DC bias RF Separate) circuit is used. In DRS, an injection signal is supplied to an oscillator from a coaxial circuit separate from a DC bias circuit and this injection signal is coupled with the electromagnetic field generated around an oscillation element. Configuring the millimeter-wave solid-state oscillator as described above can inject a stable signal into the oscillator and simplify the injection circuit.

With respect to a wireless communication system based on the injection locking of this type, Japanese Patent Laid-open No. 2001-053640 (page 4, FIG. 2) (hereinafter referred to as Patent document 1) discloses a wireless communication apparatus and a wireless communication method. This wireless communication apparatus has a wireless transmitter and a wireless receiver. The wireless receiver has a band filter and an injection-locking type oscillator. In down-converting a wirelessly transmitted signal into an intermediate frequency band on the reception side, the wireless transmitter modulates the input signal into an intermediate frequency band and up-converts a resultant intermediate frequency band modulated signal into a wireless frequency band. The wireless transmitter wirelessly transmits a local oscillation signal used in the up-conversion to the reception side along with the wireless frequency band modulated signal.

The wireless receiver receives a wireless reception signal made up of the local oscillation signal and the wireless frequency band modulated signal from the wireless transmitter and generates a multiplication component obtained by multiplying the local oscillation signal component by the wireless frequency band modulated signal component. By this generation of the multiplication component, the wireless receiver down-converts the reception signal into an intermediate frequency band to demodulate an intermediate frequency band modulated signal obtained by this down conversion.

Upon completion of the above-mentioned processing, the band filter extracts a non-modulated carrier signal (or a local oscillation signal) from the wireless reception signal (or the composite signal) made up of the local oscillation signal and the wireless frequency band modulated signal. The injection-locking type oscillator is arranged so as to reproduce the non-modulated carrier signal extracted by the band filter. Configuring the wireless communication apparatus as described allows the installation of the same local oscillator as the local oscillator installed on the transmitter, so that the configuration of the receiver can be simplified and the manufacturing cost of the receiver can be lowered.

Japanese Patent Laid-open No. 2003-244016 (page 4, FIG. 1) (hereinafter referred to as Patent document 2) discloses a wireless communication method and a wireless communication system that execute communication between two or more wireless communication terminals. This wireless communication system has one transmission station and two or more wireless communication terminals. Each of the wireless communication terminals has an injection locking oscillator, a transmission functional block, and a reception functional block. The transmission functional block multiplies an intermediate frequency band modulated signal by a local oscillation signal to generate a wireless modulated signal. The reception functional block multiplies the wireless modulated signal by the local oscillation signal to generate a down-converted intermediate frequency band signal.

Upon completion of the above-mentioned processing, the transmission station transmits only a reference local oscillation signal to each wireless communication terminal. Each of the two or more wireless communication terminals receives the reference local oscillation signal radiated from the transmission station. Each wireless communication terminal amplifies and band-filters the received reference local oscillation signal and then reproduces the reference local oscillation signal by the injection locking oscillator. Each wireless communication terminal sets the reference local oscillation signal as a local oscillation signal for use by the transmission function block and the reception functional block and executes communication between the wireless communication terminals by use of this local oscillation signal.

Configuring the system as described above allows the solution of the signal degradation caused by the local oscillation signal used to provide the effective use of frequency and, at the same time, allows the provision of a wireless communication system that supposes N-to-N communication configured by N terminals.

SUMMARY OF THE INVENTION

According to related-art wireless communication systems for transmitting and receiving millimeter waves, an injection signal volume necessary for injection locking depends on a difference between a free-running oscillation frequency at the time when there is no injection signal of the local oscillator and the frequency of an injection signal; as the frequency difference grows, the larger injection signal volume is required.

This causes the following problems.

(i) In the wireless communication systems described in Patent document 1 and Patent document 2, if the frequency difference between the local oscillation frequency of the wireless transmission apparatus and the free-running oscillation frequency of the wireless reception apparatus is relatively large, the injection signal amplitude necessary for injection locking grows excessive, thereby making it difficult to provide locking with good reproducibility even if injection locking is used by the wireless communication system concerned.

(ii) If the power of the injection signal of the local oscillation frequency on the transmission side to be injected into the wireless reception apparatus is relatively small, it is difficult to provide locking with good reproducibility between the transmission and reception side if the frequency difference between the local oscillation frequency of the transmission apparatus and the free-running oscillation frequency of the reception apparatus is relatively large (not small).

(iii) It may be considered to install a PLL circuit for free-running oscillation frequency locking on the wireless reception block in order to provide locking between the local oscillation frequency of the transmission apparatus and the free-running oscillation frequency of the reception apparatus. However, the use of a PLL circuit makes the wireless communication system complicated. Installation of an external circuit dedicated to injection locking on the wireless reception block increases the circuit scale of the wireless reception block as well as the power dissipation on the wireless reception block.

(iv) If any of the millimeter-wave solid-state oscillators described in Non-patent document 1 and Non-patent document 2 is used, a circuit other than the CMOS circuit is required, thereby making it difficult to realize the necessary circuitry in one chip, resulting in the increased cost of the wireless communication system due to the increased number of parts.

Therefore, the embodiments of the present invention address the above-identified and other problems associated with related-art methods and apparatuses and solve the addressed problems by providing a wireless transmission apparatus, a wireless reception apparatus, a wireless communication system, and a wireless communication method that are configured to provide locking between the signal of the local oscillation frequency of the wireless transmission apparatus and the signal of the free-running oscillation frequency of the wireless reception apparatus independently of the PLL circuit for free-running oscillation frequency locking and an external circuit for injection locking.

In carrying out the invention and according to one mode thereof, there is provided a wireless transmission apparatus. In this wireless transmission apparatus, a phenomenon in which, when a signal having a frequency in the proximity of an oscillation frequency is injected in an oscillator, an oscillation frequency of the oscillator is pulled into the frequency of the injected signal is defined as injection locking and an interval in which injection locking is provided so as to match a signal having a local oscillation frequency of a transmission side arranged in a housing of an apparatus with a signal having a free running oscillation frequency of a reception side in the apparatus is defined as an injection locking control interval. The above-mentioned wireless transmission apparatus has a wireless transmission block having an oscillator for oscillating a signal having a local oscillation frequency, the wireless transmission block being configured to transmit a digital signal on the basis of a signal having a local oscillation frequency oscillated by the oscillator to the reception side. During the injection locking control interval, the wireless transmission block injects a signal having a local oscillation frequency of the wireless transmission block into an oscillator of the reception side. In order to match a signal having a local oscillation frequency of the wireless transmission block injected from the wireless transmission block into the oscillator of the reception side with a signal having a free running oscillation frequency of the reception side, the wireless reception block adjusts a free running oscillation frequency of the signal of the reception side, thereby providing injection locking. After completion of the injection locking control interval, the wireless transmission block transmits a digital signal to the reception side.

According to the wireless transmission apparatus practiced as one mode of the invention, the wireless transmission block has the oscillator for oscillating a signal of a local oscillation frequency. The wireless transmission block transmits a digital signal to the reception side on the basis of the signal of the local oscillation frequency oscillated by the above-mentioned oscillator. On this premise, the wireless transmission block injects the signal of the local oscillation frequency of this wireless transmission block into the oscillator of the reception side during the injection locking control interval. In order to match a signal having a local oscillation frequency of the wireless transmission block injected from the wireless transmission block into the oscillator of the reception side with a signal having a free running oscillation frequency of the reception side, the wireless reception block adjusts a free running oscillation frequency of the signal of the reception side, thereby providing injection locking. After completion of the injection locking control interval, the wireless transmission block transmits a digital signal to the reception side. Consequently, the injection locking with the wireless transmission apparatus regarded as an external circuit allows the injection of a signal of a local oscillation frequency of the transmission side, thereby providing injection locking between a signal of a local oscillation signal of the wireless transmission apparatus and a signal of a free running oscillation frequency of the wireless reception signal during the injection locking control interval. It should be noted that injection locking is continued also during the communication interval.

In carrying out the invention and according to another mode thereof, there is provided a wireless reception apparatus. In this wireless reception apparatus, a phenomenon in which, when a signal having a frequency in the proximity of an oscillation frequency is injected in an oscillator, an oscillation frequency of the oscillator is pulled into the frequency of the injected signal is defined as injection locking and an interval in which injection locking is provided so as to match a signal having a local oscillation frequency of a transmission side arranged in a housing of an apparatus with a signal having a free running oscillation frequency of a reception side in the apparatus is defined as an injection locking control interval. The above-mentioned wireless reception apparatus has a wireless reception block having an oscillator for oscillating a signal having free running oscillation frequency, the wireless reception block receiving a modulated signal from the transmission side to modulate the reception signal on the basis of the signal having the free running oscillation frequency oscillated by the oscillator. In this wireless reception block, during the injection locking control interval, in order to match a signal having a local oscillation frequency of the transmission side injected from the transmission side into the oscillator with a signal of a local oscillation frequency of a free running oscillation frequency of the reception side to provide injection locking, the wireless reception block adjusts the oscillation frequency of the signal of the reception side and receives a digital signal from the transmission side after completion of the injection locking control interval.

According to the above-mentioned wireless reception apparatus, a wireless reception block has an oscillator for oscillating a signal having a local oscillation frequency. This wireless reception block receives a modulated signal from the transmission side and demodulates the received modulated signal into a digital signal on the basis of the signal of the local oscillation frequency oscillated by the oscillator of the wireless reception block. On this premise, during the injection locking control interval, in order to match a signal having a local oscillation frequency of the transmission side injected from the transmission side into the oscillator with a signal of a local oscillation frequency of a free running oscillation frequency of the reception side to provide injection locking, the wireless reception block adjusts the oscillation frequency of the signal of the reception side and receives a digital signal from the transmission side. The wireless reception block adjusts the oscillation frequency of the signal of the reception side to provide injection locking. The reception side receives the digital signal from the transmission side after completion of the injection locking control interval. Consequently, the injection locking with the wireless transmission block regarded as an external circuit allows the injection of a signal of a local oscillation frequency of the transmission side into the local oscillator of the reception side, thereby providing injection locking between a signal of a local oscillation signal of the wireless reception apparatus and a signal of a free running oscillation frequency of the wireless transmission signal during the injection locking control interval.

In carrying out the invention and according to still another mode thereof, there is provided a wireless communication system. In this wireless communication system, a phenomenon in which, when a signal having a frequency in the proximity of an oscillation frequency is injected in an oscillator, an oscillation frequency of the oscillator is pulled into the frequency of the injected signal is defined as injection locking and an interval in which injection locking is provided so as to match a signal having a local oscillation frequency of a transmission side arranged in a housing of an apparatus with a signal having a free running oscillation frequency of a reception side in the housing is defined as an injection locking control interval. The above-mentioned wireless communication system has a wireless transmission apparatus having an oscillator for oscillating a signal having a local oscillation frequency, the wireless transmission apparatus modulating a digital signal to transmit a resultant modulated digital signal and a wireless reception apparatus having an oscillator for oscillating a signal having a free running oscillation frequency, the wireless reception apparatus receiving the modulated digital signal from the wireless transmission apparatus to demodulate the received modulated digital signal. During the injection locking control interval, the wireless transmission apparatus injecting a signal having a local oscillation frequency of the transmission side into the oscillator of the reception side. The wireless reception apparatus, in order to match the signal having the oscillation frequency of the transmission side injected from the wireless transmission apparatus with a signal having a free running oscillation frequency of the reception side, adjusts the signal of the reception side to provide injection locking, and, after completion of the injection locking control interval, the wireless transmission apparatus transmits a digital signal to the wireless reception apparatus.

According to the above-mentioned wireless communication system, a wireless transmission apparatus and a wireless reception apparatus practiced as modes of the invention are arranged in this wireless communication system, so that the injection locking with the wireless transmission apparatus regarded as an external circuit allows the injection of the signal of the local oscillation frequency of the transmission side into the local oscillator of the reception side. This provides locking between the signal of the local oscillation frequency of the wireless transmission apparatus and the signal of the local oscillation frequency of the wireless reception apparatus during the injection locking control interval. Besides, injection locking processing can be executed also in a wireless signal transmission system that uses an oscillator fluctuating in a local oscillation frequency range due to the fluctuation in manufacturing and the fluctuation in temperature environment, for example.

In carrying out the invention and according to yet another mode thereof, there is provided a wireless communication method. In this method, a phenomenon in which, when a signal having a frequency in the proximity of an oscillation frequency is injected in an oscillator, an oscillation frequency of the oscillator is pulled into the frequency of the injected signal is defined as injection locking and an interval in which injection locking is provided so as to match a signal having a local oscillation frequency of a transmission side arranged in a housing of an apparatus with a signal having a free running oscillation frequency of a reception side in the housing is defined as an injection locking control interval. The above-mentioned wireless communication method has the steps of injecting, by a wireless transmission apparatus, a signal having a local oscillation frequency of the transmission side during the injection locking control interval into an oscillator of the reception side; in order to match the injected signal having the local oscillation frequency of the transmission side with a signal having a free running oscillation frequency of the reception side, adjusting, by the wireless reception apparatus, the oscillation frequency of the signal of the reception side to provide injection locking; and transmitting, by the wireless transmission apparatus, a digital signal to the wireless reception apparatus after completion of the injection locking control interval.

According to the wireless transmission apparatus practiced as one mode of the invention, a wireless transmission block configured to transmit a digital signal to the reception side on the basis of the signal of a local oscillation frequency is arranged in this wireless transmission apparatus. The wireless transmission block injects a signal having a local oscillation frequency of the wireless transmission block into the oscillator of the reception side during the injection locking control interval and, after completion of the injection locking control interval, transmits a resultant digital signal to the reception side.

The above-mentioned configuration allows, by the injection locking with the wireless transmission apparatus regarded as an external circuit, the injection of a signal of a local oscillation frequency of the transmission side into the local oscillator of the reception side. This provides locking between the signal of the local oscillation frequency of the wireless transmission apparatus and the signal of the local oscillation frequency of the wireless reception apparatus during the injection locking control interval.

Consequently, injection locking processing can be executed also in a wireless signal transmission system that uses an oscillator fluctuating in a local oscillation frequency range due to the fluctuation in manufacturing and the fluctuation in temperature environment, for example. Besides, because no PLL circuit for free running oscillation frequency locking and no external circuit for injection locking, for example, are required any further, the circuit scale can be reduced, thereby saving the power consumption.

According to the wireless reception apparatus practiced as another mode of the invention, a wireless reception block is arranged in the wireless reception apparatus. The wireless reception block demodulates a modulated signal received from the transmission side on the basis of the signal having a local oscillation signal. In order to match the injected signal having the local oscillation frequency of the transmission side with a signal having a free running oscillation frequency of the reception side, the wireless reception block adjusts the oscillation frequency of the signal of the reception side, thereby providing injection locking. The wireless reception block receives the digital signal from the transmission side after completion of the injection locking control interval.

The above-mentioned configuration allows, by the injection locking with the wireless transmission apparatus regarded as an external circuit, the injection of a signal of a local oscillation frequency of the transmission side into the local oscillator of the reception side. This allows the locking of the signal of the free running oscillation frequency of the wireless reception apparatus with the signal of the local oscillation frequency of the wireless transmission apparatus.

Consequently, injection locking processing can be executed also in a wireless signal transmission system that uses an oscillator fluctuating in a local oscillation frequency range due to the fluctuation in manufacturing and the fluctuation in temperature environment, for example. Besides, because no PLL circuit for free running oscillation frequency locking and no external circuit for injection locking, for example, are required any further, the circuit scale can be reduced, thereby saving the power consumption.

According to the wireless communication system and the wireless communication method, the wireless transmission apparatus injects a signal of a local oscillation frequency of the transmission side into the oscillator of the reception side during the injection locking control interval. In order to match the signal having the local oscillation frequency of the transmission side injected from the wireless transmission apparatus with the signal having the free running oscillation frequency of the reception side, the wireless transmission apparatus adjusts the oscillation frequency of the signal of the reception side, thereby providing injection locking. During the injection locking control interval, the wireless transmission apparatus transmits a resultant digital signal to the wireless reception apparatus.

The above-mentioned configuration allows, by the injection locking with the wireless transmission apparatus regarded as an external circuit, the injection of a signal of a local oscillation frequency of the transmission side into the local oscillator of the reception side. This allows the locking of the signal of the free running oscillation frequency of the wireless reception apparatus with the signal of the local oscillation frequency of the wireless transmission apparatus during the injection locking control interval.

Consequently, injection locking processing can be executed also in a wireless signal transmission system that uses an oscillator fluctuating in a free running oscillation frequency range due to the fluctuation in manufacturing and the fluctuation in temperature environment, for example. Besides, because no PLL circuit for free running oscillation frequency locking and no external circuit for injection locking, for example, are required any further, the circuit scale can be reduced, thereby saving the power consumption.

BRIEF DESCRIPTION OF THE DRAWINGS

FIGS. 17A and 17B are diagrams illustrating exemplary communication that is executed in the millimeter wave transmission system;

DETAILED DESCRIPTION OF THE PREFERRED EMBODIMENTS

This invention will be described in further detail by way of embodiments thereof with reference to the accompanying drawings in the following order:

(1) Embodiments (an overall configuration of a wireless communication system)

(2) The first embodiment (an exemplary configuration and exemplary power control of a wireless transmission apparatus)

(3) The second embodiment (an exemplary configuration and exemplary injection locking control of a first wireless reception apparatus)

(4) The third embodiment (an exemplary configuration of a first millimeter wave transmission system and a wireless communication method)

(5) The fourth embodiment (an exemplary configuration and exemplary injection locking control of a second wireless reception apparatus)

(6) The fifth embodiment (an exemplary configuration of a second millimeter wave transmission system and a wireless communication method)

(7) The sixth embodiment (an exemplary configuration and exemplary control after injection locking of a third wireless reception apparatus)

(1) Embodiments (an Overall Configuration of a Wireless Communication System)

Figure 1:
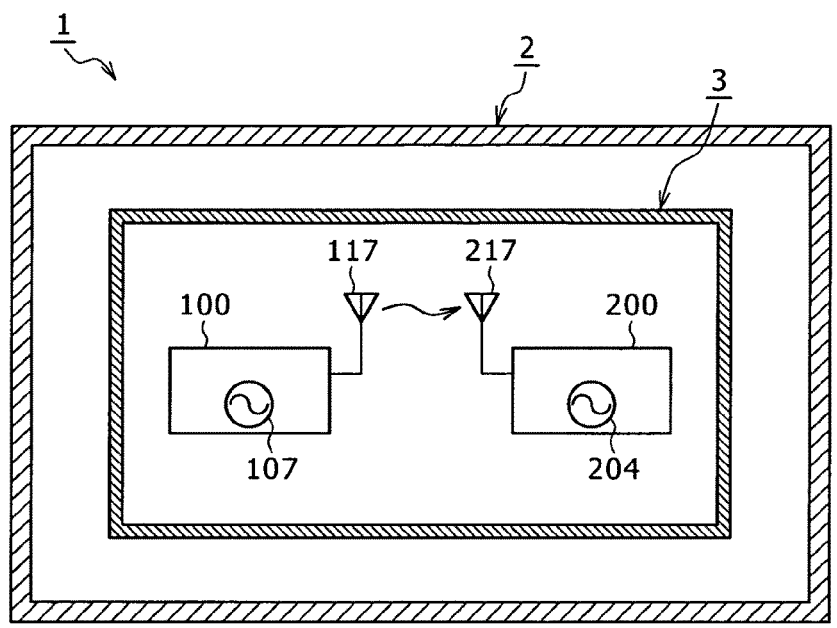
FIG. 1 is a conceptual diagram illustrating an exemplary overall configuration of a wireless communication system practiced as embodiments of the invention.

With a wireless communication system 1 shown in FIG. 1, a wireless transmission apparatus 100 and a wireless reception apparatus 200 are arranged inside a housing 3 in an apparatus 2, thereby executing wireless communication. The apparatus 2 includes a data recording/reproducing apparatus such as a hard disk recorder, a terrestrial television receiving apparatus, an imaging apparatus such as a video camera or digital camera, a mobile phone apparatus, a game apparatus, a computer, a communication apparatus, and other electronic devices. The housing 3 includes a plastic, metal, or wooden housing and a board, a rod body, and a cylinder body thereof. The housing 3 is not limited to one independent body; for example, the housing 3 may be a combination of a first housing and a second housing pivotally coupled with each other with a hinge or a slide. For example, the housing 3 may be a mobile phone of folding type or slide type.

The wireless transmission apparatus 100 is applicable to the wireless communication system 1 configured to fast transmit signals of the millimeter band with the carrier frequency for transmitting movie images and computer images, for example, being 30 GHz to 300 GHz. In this example, the wireless transmission apparatus 100 has an oscillator 107 for oscillating signals of local oscillation frequency in addition to an antenna member 117, thereby executing digital signal modulation and transmitting the modulated digital signals to the reception side through the antenna member 117.

The wireless reception apparatus 200 fast receives signals of movie images or computer images, for example, of the millimeter band with carrier frequencies ranging from 30 GHz to 300 GHz transmitted from the transmission side. In this example, the wireless reception apparatus 200 has an oscillator 204 for oscillating a signal of free-running oscillation frequency in addition to an antenna member 217 to receive a modulated signal from the wireless transmission apparatus 100, thereby demodulating a digital signal from a modulated signal.

With the wireless communication system 1, the wireless transmission apparatus 100 injects a signal having a local oscillation frequency of the transmission side into the oscillator 204 on the reception side during an injection locking control interval. The injection locking control interval denotes an interval in which injection locking is provided so as to match a signal having local oscillation frequency of the transmitting side arranged in the housing of the wireless communication system 1 with a signal having free-running oscillation frequency of the reception side in this housing. The injection locking denotes a phenomenon in which, when a signal of a frequency in the proximity of the oscillation frequency is injected in the oscillator 204 for example, the free-running oscillation frequency of this oscillator 204 is pulled in the frequency of the injected signal.

In order to match a signal having oscillation frequency of the transmission side injected from the wireless transmission apparatus 100 with a signal having free-running oscillation signal of the reception side, the wireless reception apparatus 200 adjusts the free-running oscillation frequency of the signal to provide injection locking. After the passing of the injection locking control interval, the wireless transmission apparatus 100 transmits a resultant digital signal to the wireless reception apparatus 200.

(2) The First Embodiment

Exemplary Configuration of the Wireless Transmission Apparatus

Figure 2:
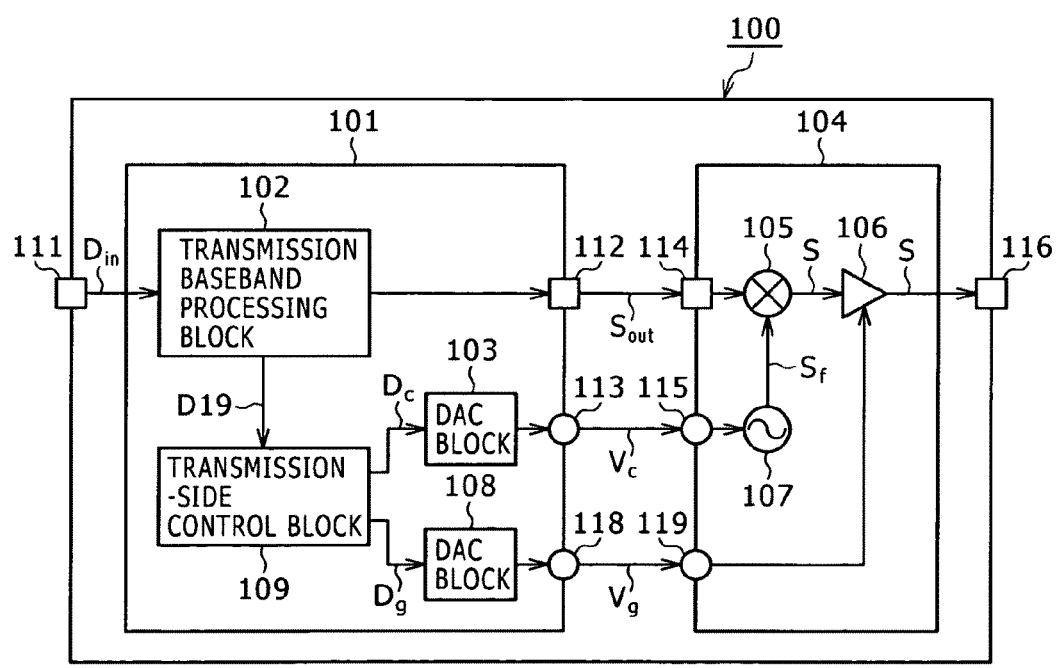
FIG. 2 is a block diagram illustrating an exemplary configuration of a wireless transmission apparatus practiced as a first embodiment of the invention.

The wireless transmission apparatus 100 shown in FIG. 2 is configured by a transmission processing block 101 and a wireless transmission block 104. The transmission processing block 101 is configured by a transmission baseband processing block 102, a digital-to-analog converter (hereafter referred to as a DAC block) 103, a DAC block 108, a transmission-side control block 109, an input terminal 111, and output terminals 112, 113, and 118. The transmission processing block 101 processes digital signal Din and outputs resultant transmission baseband signal Sout to the wireless transmission block 104.

The input terminal 111 is connected with the transmission baseband processing block 102 that configures one example of the data processing block, in which digital signal Din is entered from an upper digital data processing block. The transmission baseband processing block 102 processes digital signal Din and outputs resultant transmission baseband signal Sout to the wireless transmission block 104 through the output terminal 112.

The transmission baseband processing block 102 is connected with the transmission-side control block 109. Control data D19 is entered in the transmission-side control block 109 from the transmission baseband processing block 102. On the basis of the entered control data D19, the transmission-side control block 109 generates digital oscillation control data Dc. The generated digital oscillation control data Dc is outputted to the DAC block 103. The DAC block 103 is connected to the output terminal 113. The DAC block 103 configures one example of a digital-to-analog converter to convert oscillation control data Dc outputted from the transmission-side control block 109 into analog oscillation control voltage Vc, outputting analog oscillation control voltage Vc to the wireless transmission block 104 through the output terminal 113.

The transmission-side control block 109 is connected with the DAC block 108 in addition to the DAC block 103. The DAC block 108 is connected to the output terminal 118. The DAC block 108 configures one example of a digital-to-analog converter to convert gain control data Dg outputted from the transmission-side control block 109 into analog gain control voltage Vg, outputting analog gain control voltage Vg to the wireless transmission block 104 through the output terminal 118. Configuring the transmission processing block 101 as described above allows the outputting of oscillation control voltage Vc after D/A conversion from the DAC block 103 to the wireless transmission block 104 and gain control voltage Vg after D/A conversion from the DAC block 108 to the wireless transmission block 104. Gain control voltage Vg is used for transmission power control.

The transmission baseband processing block 102 described above is connected with the wireless transmission block 104 through the output terminal 112. The wireless transmission block 104 is configured by an up-conversion circuit (hereafter referred to as an UPMIX block) 105, a power amplifier (hereafter referred to as an AMP block) 106, and a voltage controlled oscillator (hereafter referred to as a VCO block) 107. On the basis of local oscillation signal Sf oscillated by the VCO block 107, the wireless transmission block 104 transmits modulated signal S (a millimeter wave signal) to the reception side.

In addition to the above-mentioned components, the wireless transmission block 104 has input terminals 114, 115, and 119 and an output terminal 116. The above-mentioned output terminal 113 of the transmission processing block 101 is connected to the input terminal 115 of the wireless transmission block 104. The input terminal 115 is connected with the VCO block 107 that configures one example of an oscillator. The VCO block 107 oscillates a signal of local oscillation frequency ftx (hereafter referred to as local oscillation signal Sf) on the basis of oscillation control voltage Vc entered from the DAC block 103.

The output terminal 118 of the transmission processing block 101 is connected to the input terminal 119 of the wireless transmission block 104. The input terminal 119 is connected with the AMP block 106. The AMP block 106 adjusts the gain (or amplitude) of the AMP block 106 on the basis of gain control voltage Vg entered from the DAC block 108. To increase the transmission power by the wireless transmission block 104, gain control voltage Vg that raises the gain of the AMP block 106 is supplied. In contrast, to lower the transmission power by the wireless transmission block 104, gain control voltage Vg that lowers the gain of the AMP block 106 is supplied to wireless reception apparatus 200.

The above-mentioned transmission processing block 101 controls local oscillation frequency ftx of local oscillation signal Sf oscillated by the VCO block 107 on the basis of oscillation control voltage Vc. This control allows the oscillation of stable local oscillation signal Sf of the transmission side for injecting local oscillation signal Sf of the transmission side during an injection locking control interval (hereafter referred to as a training interval).

The output terminal 112 of the above-mentioned transmission processing block 101 is connected to the input terminal 114 of the wireless transmission block 104. The input terminal 114 is connected with the UPMIX block 105 that configures one example of a modulation block. On the basis of local oscillation signal Sf oscillated by the VCO block 107, the UPMIX block 105 executes amplitude modulation, for example, on transmission signal Sout and outputs resultant modulated signal S.

The UPMIX block 105 is connected with the AMP block 106 that configures one example of an amplifier. The AMP block 106 is connected with the antenna member 117 shown in FIG. 1. The AMP block 106 amplifies modulated signal S outputted from the UPMIX block 105, outputting modulated signal S to the antenna member 117 shown in FIG. 1 through the output terminal 116. Modulated signal S is radiated to the reception side in the form of electromagnetic waves.

In this example, with the wireless transmission apparatus 100, the wireless transmission block 104 injects local oscillation frequency Sf of the wireless transmission block 104 into the oscillator (VCO) on the reception side during a training interval. On the reception side, free-running oscillation frequency frx of local oscillation signal Sf is adjusted for injection locking by matching local oscillation signal Sf of the wireless transmission block 104 injected from the wireless transmission block 104 into the oscillator (VCO) of the wireless transmission block 104 with local oscillation signal Sf of the reception side. The wireless transmission block 104 transmits modulated signal S (a millimeter wave signal) to the reception side in a communication interval subsequent to this injection locking control interval. The communication interval herein denotes an interval in which a digital signal is transmitted from the transmission side to the reception side. It should be noted that injection locking is continued into the communication interval.

Figure 3:
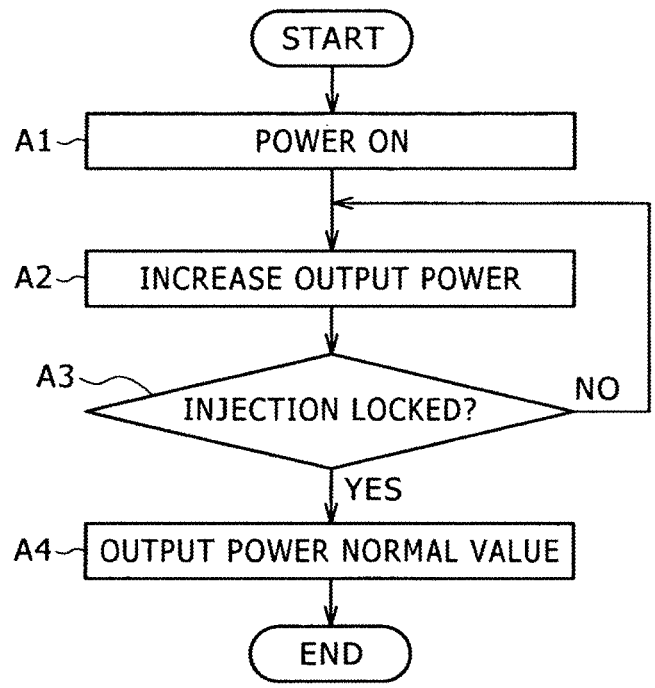
FIG. 3 is a flowchart indicative of an example of power control of a wireless transmission block at the time of injection locking by a transmission processing block.

The following describes an example of the power control of the wireless transmission block 104 at the time of injection locking executed by the transmission processing block 101 with reference to the flowchart shown in FIG. 3. In this power control example, the output power of the wireless transmission apparatus 100 is increased in a training interval and the increased output power is returned to a normal level in the communication interval. Under this control condition, in step A1 shown in FIG. 3, upon detection of power ON information, the transmission processing block 101 moves to step A2 to increase the output power.

At this moment, the transmission processing block 101 controls the VCO block 107 by oscillation control voltage Vc outputted from the DAC block 103 as well as the output of the UPMIX block 105 on the basis of local oscillation signal Sf of the VCO block 107. At the same time, the wireless transmission block 104 controls the gain of the AMP block 106 on the basis of gain control voltage Vg outputted from the DAC block 108. The AMP block 106 amplifies the output of the UPMIX block 105 to adjust the transmission power.

Next, in step A3, the transmission processing block 101 determines whether injection locking has been provided (or injection-locked) or not, thereby branching control. To be more specific, a locking completed signal is returned from the wireless reception apparatus 200 to the wireless transmission apparatus 100 and the transmission processing block 101 determines whether the wireless transmission apparatus 100 that received the locking completed signal has been injection-locked or not, for example. If the injection locking found not provided, namely, if the locking completed signal has not been returned from the wireless reception apparatus 200 to the wireless transmission apparatus 100, control is returned to step A2, in which the transmission processing block 101 continues the output power increase control. For example, the transmission processing block 101 outputs gain control voltage Vg to the AMP block 106 through the DAC block 108 to gradually increase the amplitude of the AMP block 106 from the normal setting value.

If the injection locking is found provided, then control is moved to step A4, in which the transmission processing block 101 returns the increased output power to the normal value. For example, after the injection locking control interval, the transmission processing block 101 lowers the amplitude of the AMP block 106 to return the output to the normal setting value. Controlling the AMP block 106 as described can hold down the power dissipation during the communication interval as compared with the power dissipation during the training interval.

As described above, the wireless transmission apparatus 100 practiced as the first embodiment of the invention has the transmission processing block 101 and the wireless transmission block 104. The wireless transmission block 104 injects local oscillation signal Sf of the wireless transmission block 104 into the oscillator 204 (VCO) on the reception side during a training interval. The wireless reception apparatus 200 adjusts free-running oscillation frequency frx of local oscillation signal Sf to match local oscillation signal Sf of local oscillation frequency ftx of the transmission side injected from the wireless transmission apparatus 100 with local oscillation signal Sf of the reception side, thereby providing injection locking. And, stable local oscillation signal Sf on the transmission side for injection-locking local oscillation signal Sf on the reception side can be injected in the wireless reception apparatus 200 in the training interval.

Therefore, local oscillation signal Sf of local oscillation frequency ftx of the transmission side can be injected in the VCO block 107 (or a local oscillator) of the reception side by the injection locking that regards the wireless transmission apparatus 100 as an external circuit. This allows locking between local oscillation signal Sf of the wireless transmission apparatus 100 and local oscillation signal Sf of the wireless reception apparatus during the training interval. Besides, because the wireless transmission block 104 can control the amplitude of modulated signal S (millimeter wave signal) on the basis of oscillation control voltage Vc, data can be transmitted to the reception side at high speeds and with high reliability during the communication interval after the injection locking.

The above-mentioned configuration allows any wireless signal transmission system that uses an oscillator (VCO for example) in which the range of local oscillation frequency ftx of the reception side fluctuates due to manufacturing fluctuations, temperature environment variations, or the like to surely execute injection locking. And, because external circuits, such as a PLL circuit for free-running oscillation frequency locking and an external circuit for injection locking are required no more, the circuit scale of the system can be reduced, leading to power saving.

(3) The Second Embodiment

Exemplary Configuration of the First Wireless Reception Apparatus

Figure 4:
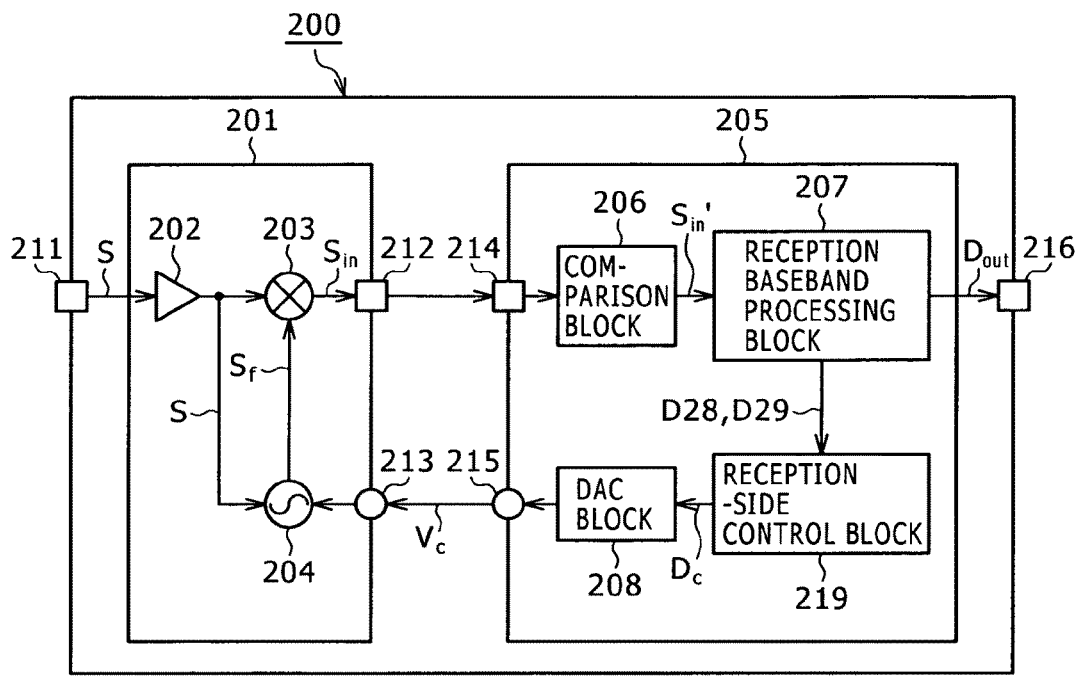
FIG. 4 is a block diagram illustrating an exemplary configuration of a wireless reception apparatus practiced as a second embodiment of the invention.

The wireless reception apparatus 200 shown in FIG. 4 can communicate with the wireless transmission apparatus 100 shown in FIG. 2 on a one-to-one basis. The wireless reception apparatus 200 is applicable to millimeter-wave transmission systems for fast transmitting signals of millimeter band having carrier frequencies 30 GHz to 300 GHz for carrying movie images and computer images, for example.

In this example, the wireless reception apparatus 200 executes injection locking processing. An equation used in the injection locking processing is as follows.

$$\frac{d\phi}{dt} = \omega_0 - \omega_{inj} + \frac{\rho\omega_0}{2\alpha Q}\sin(\varphi - \phi) \tag{1}$$

Where, $\omega 0$ = free-running oscillation frequency frx of the wireless reception apparatus 200;

$\omega inj$ = frequency of transmission signal Sout;

Φ=phase of free-running oscillation frequency of the wireless reception apparatus 200;

φ=phase of transmission signal Sout;

α=amplitude of free-running oscillation frequency frx of the wireless reception apparatus 200;

ρ=amplitude of transmission signal Sout; and

Q=acuity.

The wireless reception apparatus 200 is configured by a wireless reception block 201 and a reception processing block 205. The wireless reception block 201 adjusts free-running oscillation frequency frx of local oscillation frequency Sf so as to match modulated signal S of local oscillation frequency ftx injected from the transmission side with local oscillation signal Sf of the reception side during a training interval, thereby providing injection locking. The wireless reception block 201 receives data from the transmission side in the communication interval following the injection locking.

The wireless reception block 201 is configured by a low noise amplifier (hereafter referred to as an LNA block) 202, a down-conversion circuit (hereafter referred to as a down mixer, or DOWNMIX block) 203, and a VCO block 204. In addition to these components, the wireless reception block 201 has input terminals 211 and 213 and an output terminal 212. The wireless reception block 201 receives modulated signal S (or the electromagnetic wave based on a millimeter wave signal) from the transmission side through an antenna member, not shown, to demodulate reception signal Sin on the basis of local oscillation signal Sf oscillated by the VCO block 204.

The input terminal 211 is connected with an antenna member, not shown and the LNA block 202. The LNA block 202 configures one example of an amplifier and amplifies modulated signal S received from the transmission side. The above-mentioned output terminal 212 is connected to the output of the DOWNMIX block 203.

The LNA block 202 is connected with the DOWNMIX block 203 and the VCO block 204. The VCO block 204 oscillates free-running oscillation frequency frx (hereafter referred to as local oscillation signal Sf) on the basis of oscillation control voltage Vc. The DOWNMIX block 203 configures one example of a demodulation block and demodulates modulated signal S amplified by the LNA block 202 into reception signal Sin on the basis of local oscillation signal Sf of the VCO block 204 controlled by a DAC block 208 of the reception processing block 205.

The above-mentioned output terminal 212 of the wireless reception block 201 is connected to the reception processing block 205. The reception processing block 205 digitally processes reception signal Sin outputted from the wireless reception block 201 to output digital signal Dout. The reception processing block 205 is configured by a comparison block (or a comparator) 206, a reception baseband processing block 207, a digital-to-analog converter (hereafter referred to as a DAC block) 208, and a reception-side control block 219. In addition to these components, the reception processing block 205 has an input terminal 214 and output terminals 215 and 216. The above-mentioned output terminal 212 is connected to the input terminal 214 of the reception processing block 205.

In this example, the input terminal 214 is connected with the comparison block 206 configuring one example of a detection block. The comparison block 206 outputs a reception signal (hereafter referred to as a binary reception signal Sin') obtained by binarizing reception signal Sin. Detection of the number of edges per second of this binary reception signal Sin' allows measuring of the frequency of reception signal Sin outputted from the DOWNMIX block 203. Binary reception signal Sin' contains frequency difference f∈ between local oscillation frequency ftx of the transmission side and free-running oscillation frequency frx of the reception side. Frequency f∈ is (ftx−frx). For the comparison block 206, a 1-bit analog-to-digital converter is used. Binary reception signal Sin' including frequency difference f∈ is outputted to the reception baseband processing block 207.

The comparison block 206 is connected with the reception baseband processing block 207 configuring one example of a data processing block. The reception baseband processing block 207 digitally processes binary reception signal Sin' outputted from the comparison block 206 during a training interval to output resultant digital frequency difference data D28. Frequency difference data D28 is indicative of the number of edges of binary reception signal Sin' counted by the reception baseband processing block 207. The reception baseband processing block 207 digitally processes binary reception signal Sin' to demodulate digital signal Dout during the communication interval to output demodulated digital signal Dout to an upper digital processing block through the output terminal 216.

The reception baseband processing block 207 is connected with a reception-side control block 219. The reception-side control block 219 generates digital oscillation control data Dc from frequency difference data D28. The reception-side control block 219 is connected with the DAC 208. The DAC 208 converts oscillation control data Dc outputted from the reception-side control block 219 into analog oscillation control voltage Vc. The above-mentioned output terminal 215 of the reception processing block 205 is connected to the input terminal 213 of the wireless reception block 201. The oscillation control voltage Vc is outputted (or fed back) to the VCO block 204 through the output terminal 215 and the input terminal 213.

In this example, the reception processing block 205 controls the output of the VCO block 204 on the basis of oscillation control voltage Vc outputted from the DAC 208. For example, the reception processing block 205 first adjusts oscillation control voltage Vc of the VCO block 204 during a training interval to provide injection locking. Next, the reception processing block 205 detects first oscillation control voltage Vc1 in which local oscillation signal Sf of the transmission side injected from the wireless transmission apparatus 100 is matched with local oscillation signal Sf of the reception side to provide almost constant (or least changing) reception signal Sin. In addition, the reception processing block 205 adjusts oscillation control voltage Vc to detect oscillation control voltage Vc2 at the time when reception signal Sin begins fluctuating. Then, the reception processing block 205 computes a mean value (or oscillation control voltage Vc) between oscillation control voltages Vc1 and Vc2 to fix oscillation control voltage Vc obtained by the computation after the injection locking control interval.

Configuring the wireless reception block 201 and the reception processing block 205 as described above allows outputting of oscillation control voltage Vc of two or more steps from the DAC 208 to the VCO block 204, thereby controlling the output of the VCO block 204 on the basis of oscillation control voltage Vc. Consequently, during the training interval, free-running oscillation frequency frx of local oscillation signal Sf of the wireless reception apparatus 200 can be locked with local oscillation frequency ftx of local oscillation signal Sf of the transmission side.

Also, the reception processing block 205 controls the VCO block 204 by oscillation control voltage Vc outputted from the DAC 208. For example, if frequency difference f∈ is relatively large, the reception processing block 205 lowers free-running oscillation frequency of the VCO block 204. If frequency difference f∈ is relatively small, the reception processing block 205 raises free-running oscillation frequency of the VCO block 204. Configuring the reception processing block 205 as described above allows control of the amplitude of reception signal Sin on the basis of oscillation control voltage Vc, thereby injection-locking local oscillation signal Sf of the reception side with local oscillation signal Sf of the transmission side.

Further, the reception processing block 205 controls the VCO block 204 by oscillation control voltage Vc outputted from the DAC 208 and controls the output of DOWNMIX block 203 on the basis of local oscillation signal Sf of the VCO block 204. Configuring the reception processing block 205 as described above allows control of the amplitude of reception signal Sin at the time of demodulation on the basis of oscillation control voltage Vc, thereby injection-locking local oscillation signal Sf of the reception side into local oscillation signal Sf of the transmission side during the training interval. It should be noted that a DAC block, not shown, may be connected in addition to the DAC 208 connected to the reception-side control block 219 to control the output of the above-mentioned LNA block 202 by the additionally connected DAC block. For example, as described before with respect to the wireless transmission apparatus 100, the gain control data outputted from the reception-side control block 219 can be converted into an analog gain control voltage to output a resultant analog gain control voltage to the LNA block 202. This gain control voltage is used for controlling received powers. If the frequency is relatively high, the amplitude of the LNA block 202 is raised. If the frequency is relatively low, the amplitude of the LNA block 202 is lowered. Consequently, the output of the LNA block 202 can be controlled on the basis of local oscillation signal Sf of the VCO block 204.

Figure 5:
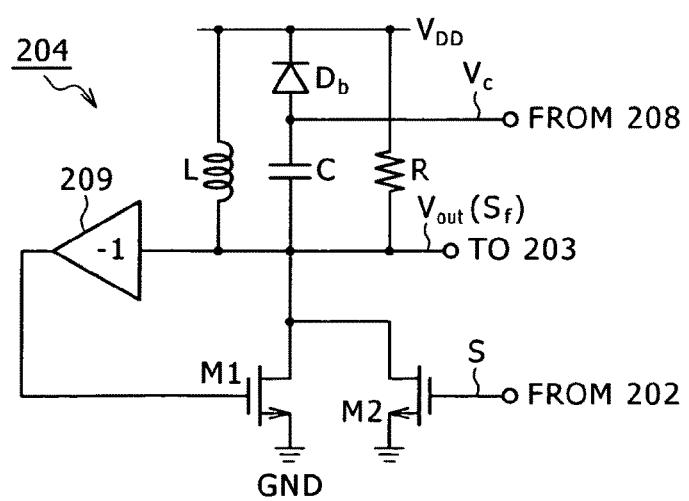
FIG. 5 is a circuit diagram illustrating an exemplary internal configuration of a VCO block.

The following describes an exemplary internal configuration of the VCO block 204. The VCO block 204 shown in FIG. 5 has an inductance L, a capacitor C, a load resistor Rp, a logic inversion element (hereafter referred to as an inverter) 209, a diode Db (or varactor), and switching field effect transistors (hereafter simply referred to as transistors M1 and M2). The VCO block 204 is configured by a voltage-controlled oscillator and the diode Db, the inductance L, and the capacitor C make up an oscillator element.

The diode Db and the capacitor C are interconnected in series. To the series-connection section between the diode Db and the capacitor C, the DAC 208 is connected. From the DAC 208, oscillation control voltage Vc is supplied through the output terminal 215 and the input terminal 213. The inductance L, the series circuit of the diode Db and the capacitor C, and load resistor Rp are interconnected in parallel, one end of each of these components being connected to power supply line VDD.

The other end of each of these components is connected to an output terminal 210, the sources of the transistors M1 and M2, and the input of the inverter 209. The output of the inverter 209 is connected to the gate of the transistor M1. The drains of the transistors M1 and M2 are connected to ground GND. The gate of the transistor M2 is connected to the LNA block 202 to be amplified by the LNA block 202 and is supplied with modulated signal S after being amplified by the LNA block 202. Oscillation voltage Vout of free-running oscillation frequency is outputted from the output terminal 210 to the DOWNMIX block 203. Here, let inductance be L, capacitor be C, free-running oscillation frequency be f, and resonance frequency be ω0 (=2πf), then ω0 is expressed by equation (2) below:

$$\omega_0 = \frac{1}{\sqrt{L \cdot C}} \quad (2)$$

Figure 6A:
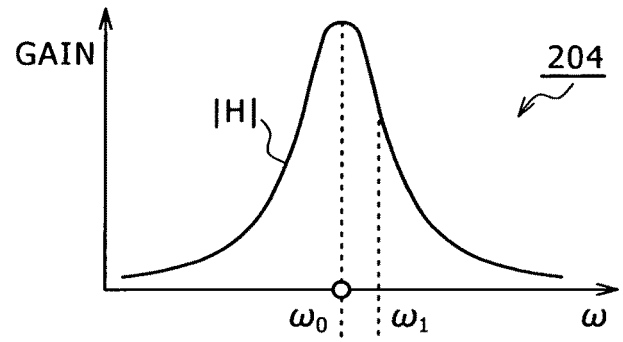
FIGS. 6A and 6B are frequency characteristics diagrams illustrating exemplary frequency characteristic of the VCO block.
Figure 6B:
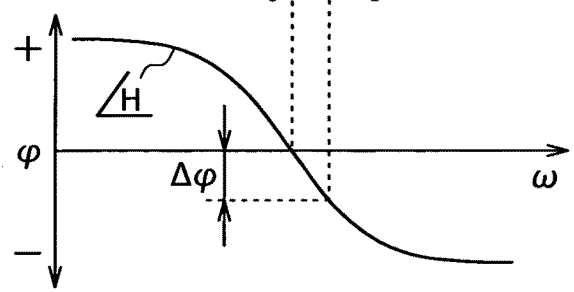

FIGS. 6A and 6B show frequency characteristics indicative of one example of the oscillation characteristic of the VCO block 204. In FIGS. 6A and 6B, the horizontal axis is representative of frequency ω and the vertical axis is representative of gain (dB) and phase angle φ. The gain is a loop gain of a feedback circuit made up of the transistor M1 and the inverter 209. |H| shown in FIG. 6A is representative of a curve showing one example of resonation (Q value) characteristic of the VCO block 204. ω0 is representative of resonance frequency. H shown in FIG. 6B is representative of a curve showing one example of the phase characteristic of the VCO block 204. The phase of the VCO block 204 zero-crosses at that resonance point. If angular frequency ω is low relative to the resonance point, the phase deflects to "+" side. Likewise, if angular frequency ω is high relative to the resonance point, the phase deflects to "−" side.

In the figure, Δφ is representative of a phase difference occurring between modulated signal S having local oscillation frequency ftx injected from the transmission side and local oscillation signal Sf of the wireless reception apparatus 200. If a signal oscillated with an oscillation frequency of ω1 is injected in the VCO block 204 and the VCO block 204 is locked with this signal, phase difference Δφ occurs when the oscillation frequency of the VCO block 204 shown in FIG. 5 shifts from ω0 to ω1.

In this example, in order to eliminate phase difference Δφ between modulated signal S (or local oscillation signal Sf) injected from the transmission side and local oscillation signal Sf of the wireless, reception apparatus 200, a match has to be provided between local oscillation frequency ftx and free-running oscillation frequency frx of these signals. However, if there is a difference between local oscillation frequency ftx and free-running oscillation frequency frx of these signals and if locking is provided between these signals by injection locking, a match is provided between local oscillation frequency ftx and free-running oscillation frequency frx, thereby making frequency difference f∈ not apparent.

Therefore, with a method in which local oscillation frequency ftx and free-running oscillation frequency frx are observed, it is difficult to make correction of minimizing phase difference Δφ between modulated signal S having local oscillation frequency ftx injected from the transmission side and local oscillation signal Sf of the wireless reception apparatus 200 if frequency difference f∈ becomes not apparent. The following describes a method of detecting phase difference Δφ to correct the detected phase difference Δφ.

Exemplary Operations of the Wireless Reception Apparatus

Figure 7:
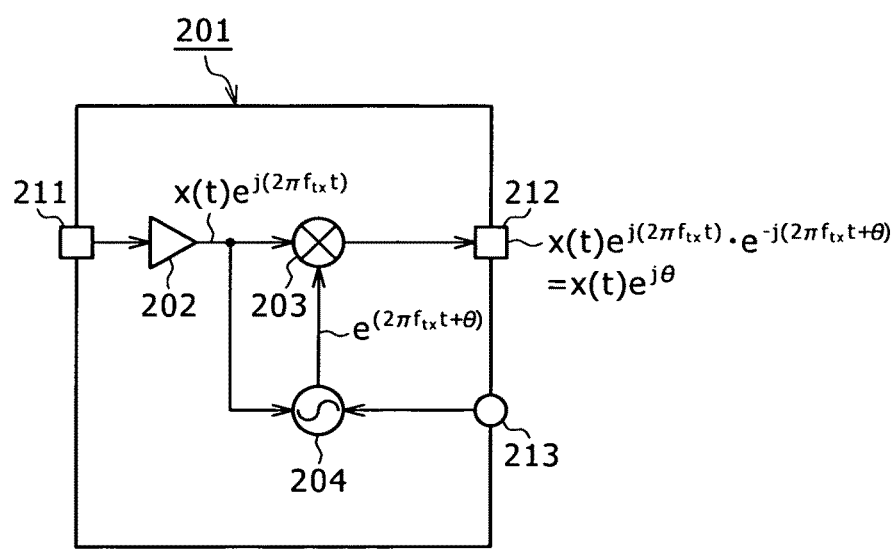
FIG. 7 is a circuit diagram illustrating an exemplary operation of a wireless reception block.

According to the wireless reception block 201 shown in FIG. 7, modulated signal S (a signal of millimeter wave) received at the antenna member 217 shown in FIG. 1 by the input terminal 211 is amplified by the LNA block 202 to be entered in the DOWNMIX block 203 and the VCO block 204. The output from the VCO block 204 is entered in the DOWNMIX block 203.

Here, let modulated signal S be equation (3) below:

$$S = X(t) e^{j(2\pi f_{tx} t)} \quad (3)$$

And let local oscillation signal Sf be equation (4) below:

$$Sf = e^{j(2\pi f_{tx} + \theta)} \quad (4)$$

Now, use of the injection locking described above provides locking between local oscillation signal Sf of local oscillation frequency ftx entered in the DOWNMIX block 203 and local oscillation signal Sf of free-running oscillation frequency frx, thereby making local oscillation frequency ftx and free-running oscillation frequency frx equal to each other. In equation (4) above, reception signal Sin outputted from DOWNMIX block 203 to output terminal 212 after ftx=frx becomes equation (5) below:

$$\mathrm{Sin} = x(t)e^{j(2\pi f_{tx})} \cdot e^{-j(2\pi f_{tx} + \theta)} \quad (5)$$

$$= x(t)e^{-j\theta}$$

However, as described above, even if there is no more frequency difference f∈ between local oscillation signal Sf of local oscillation frequency ftx and local oscillation signal Sf of free-running oscillation frequency frx as a result of the injection locking processing, phase difference $L_9$ occurs. As equation (4) indicates, even if local oscillation frequency ftx and free-running oscillation frequency frx become equal to each other by the provision of locking and phase difference Δϕ exists, a constant is set to the reception (or demodulated) signal at x(t), thereby reducing the amplitude.

In contrast, if no phase difference Δϕ is found between modulated signal S having local oscillation frequency ftx to be entered in the DOWNMIX block 203 and local oscillation signal Sf having free-running oscillation frequency frx, the output amplitude from the wireless transmission apparatus 100 is at the maximum. Such output amplitude maximum value detection processing executes data processing by use of an analog-to-digital converter in place of the comparison block 206, which will be described in detail in the description of the fifth and sixth embodiments.

Figure 8:
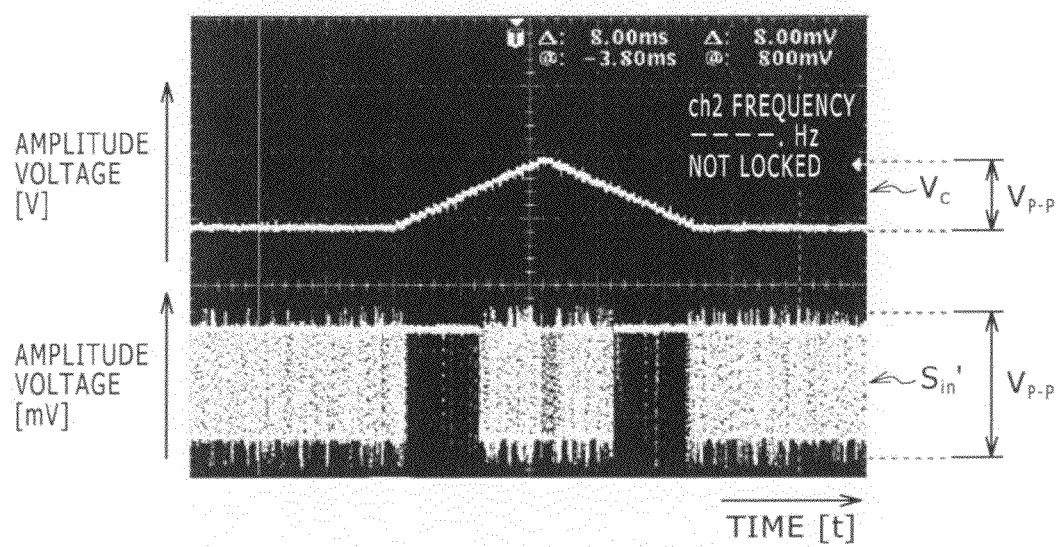
FIG. 8 is a diagram illustrating exemplary output waveforms of oscillation control voltage Vc and binary reception signal Sin'.

The following describes exemplary output Waveforms (experiment results) of oscillation control voltage Vc and binary reception signal Sin' with reference to FIG. 8. In FIG. 8, the horizontal axis is representative of time t and the vertical axis is representative of amplitude (voltage) of each of oscillation frequency voltage Vc and binary reception signal Sin'. Oscillation control voltage Vc is around 2.00 V at VP-P. Reception signal Sin' is around 200 mV at VP-P.

The output waveform example shown in FIG. 8 is indicative of an output example from the comparison block 206 obtained by outputting only local oscillation signal Sf from the wireless transmission apparatus 100 shown in FIG. 2 and varying oscillation control voltage Vc of the VCO block 204 of the wireless reception apparatus 200 shown in FIG. 4 during a training interval. Waveform lines of triangle-shape shown in the top of FIG. 8 are representative of oscillation control voltage Vc outputted from the VCO block 204. Waveform lines of intermittent vibrations shown in the bottom of FIG. 8 are representative of binary reception signal Sin' outputted from the comparison block 206.

Reception signal Sin obtained by outputting only local oscillation signal Sf from the wireless transmission apparatus, receiving outputted local oscillation signal Sf by the wireless reception apparatus, and down-mixing the received local oscillation signal Sf is as shown in equation (6) below:

$$\mathrm{Sin} = e^{j(2\pi f_{tx}t)} \cdot e^{-j(2\pi f_{rx}t)} \quad (6)$$

$$= e^{j(2\pi (f_{tx} - f_{rx})t)}$$

Thus, a signal having frequency difference f∈ between local oscillation frequency ftx of the VCO block 107 of the wireless transmission apparatus 100 and free-running oscillation frequency frx of the VCO block 204 of the wireless reception apparatus 200 appears. Therefore, if there is a match between local oscillation frequency ftx and free-running oscillation frequency frx, an output value that remains unchanged for a certain period of time is obtained from the comparison block 206, thereby allowing the confirmation that locking has been provided between local oscillation frequency ftx of the wireless transmission apparatus 100 and free-running oscillation frequency frx of the wireless reception apparatus 200. It should be noted that, in the waveform lines shown at the bottom of the figure, each portion in which a vibratory waveform drops is indicative of the locking provided between local oscillation frequency ftx and free-running oscillation frequency frx, from which a value fixed to "1" or "0" is outputted.

Consequently, it is clear that locking between local oscillation frequency ftx of the wireless transmission apparatus 100 and free-running oscillation frequency frx of the wireless reception apparatus 200 can be provided by injection locking by adjusting free-running oscillation frequency frx of the wireless reception apparatus 200 to make free-running oscillation frequency frx of a certain range. In contrast, if the difference between local oscillation frequency ftx of the wireless transmission apparatus 100 and free-running oscillation frequency frx of the wireless reception apparatus 200 is relatively large, locking may not be provided by the use of injection locking. It should be noted that, even in an environment where the oscillation frequency range changes due to temperature environment variation for example, the injection locking processing can provide high-speed locking between local oscillation frequency ftx of local oscillation signal Sf of the wireless transmission apparatus 100 and free-running oscillation frequency frx of the wireless reception apparatus 200.

If a locking identification modulated signal (hereafter referred to as a syncword) obtained by superimposing signal processing on local oscillation signal Sf is transmitted from the wireless transmission apparatus 100, the wireless reception apparatus 200 that has received this syncword executes injection locking processing. It has been experimentally confirmed that this injection locking processing can also provide locking between local oscillation frequency ftx of the wireless transmission apparatus 100 and free-running oscillation frequency frx of the wireless reception apparatus 200.

Variation 1

Figure 9:
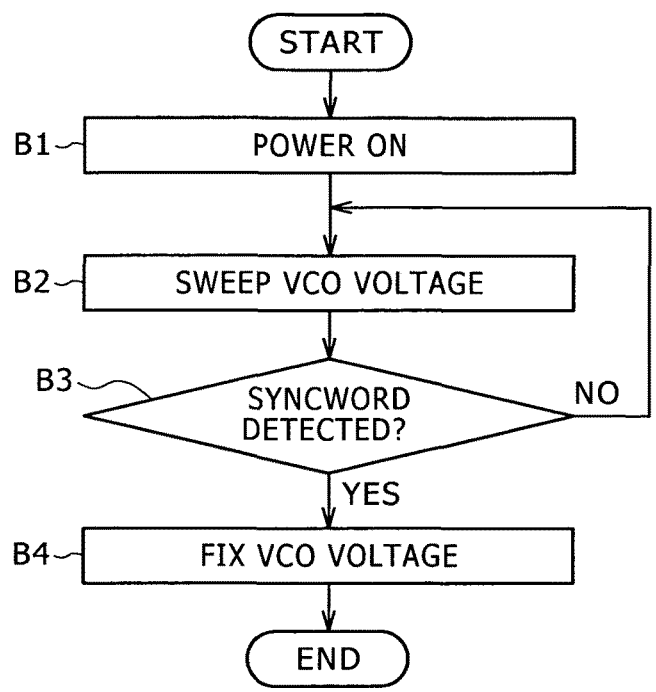
FIG. 9 is a flowchart indicative of exemplary syncword detection processing at the time of injection locking control practiced as a first variation example.

The following describes an example of syncword detection processing at the time of injection locking control in the wireless reception apparatus 200 with reference to FIG. 9. In this example, the wireless reception apparatus 200 executes the syncword detection processing during a training interval. The syncword detection processing denotes the demodulation of a syncword transmitted from the transmission side and detection of the demodulated syncword. The following describes this processing in a method in which binary reception signal Sin' outputted from the comparison block 206 is used in the execution of injection locking control by adjusting free-running oscillation frequency frx of the VCO block 204 by the wireless reception apparatus 200. The wireless transmission apparatus 100 transmits transmission signal Sout obtained by modulating a syncword (digital signal Din) of 40 bits for example by superimposing this syncword on local oscillation signal Sf having local oscillation frequency ftx.

Under this control condition, when power ON information is detected in step B1 shown in FIG. 9, the reception processing block 205 moves to step B2 to adjust oscillation control voltage Vc (or VCO voltage) to execute sweep processing. At this moment, the reception processing block 205 receives the syncword while adjusting free-running oscillation frequency frx. In an out of sync state, no syncword can be detected, so that the reception processing block 205 keeps adjusting free-running oscillation frequency frx.

Figure 16:
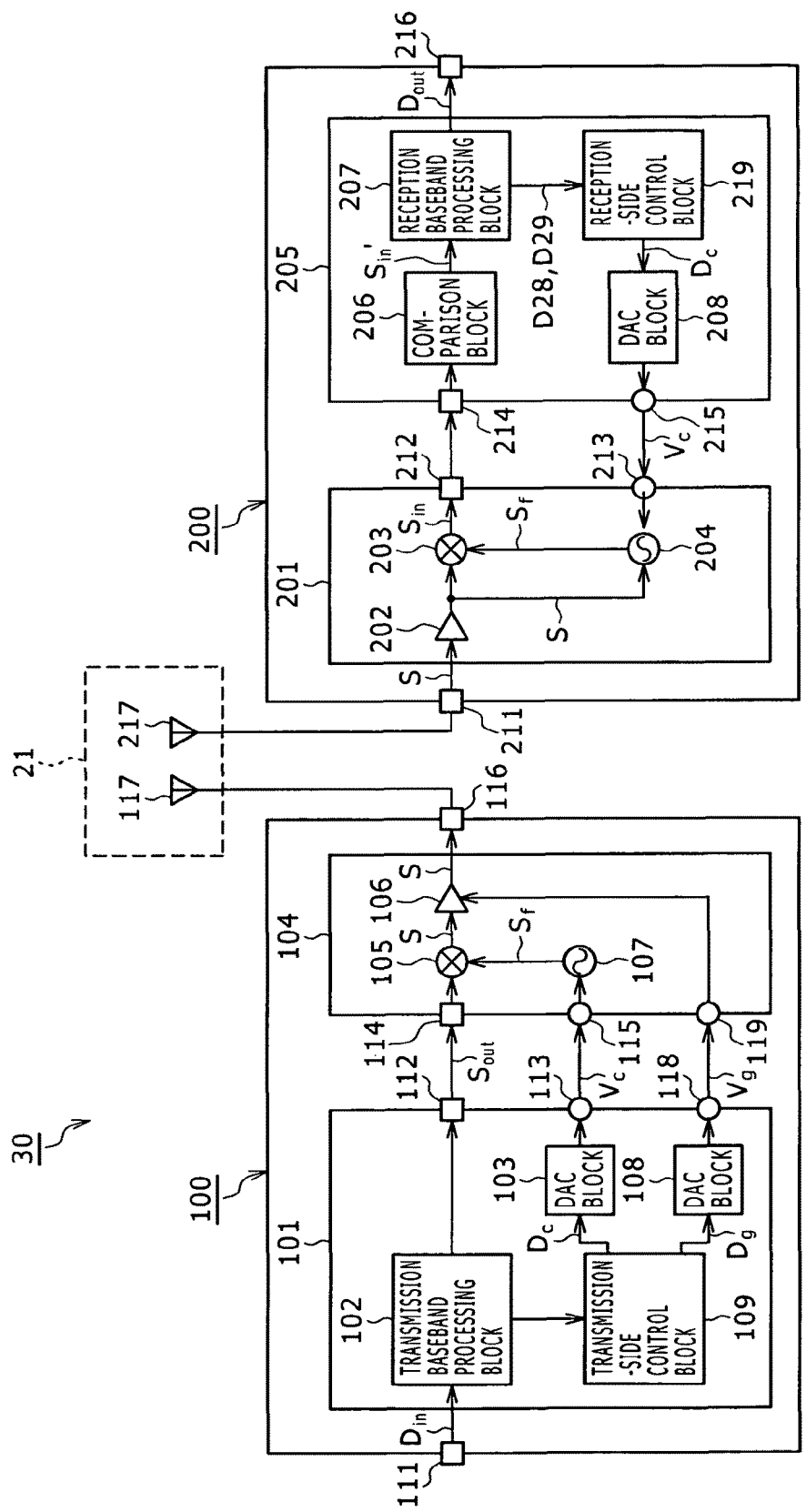
FIG. 16 is a block diagram illustrating an exemplary configuration of a millimeter wave transmission system practiced as a third embodiment of the invention.

Next, in step B3, the reception processing block 205 executes syncword detection processing and determines whether injection locking has been provided, thereby branching control. This determination is made by receiving a syncword from the transmission side and by determining whether the detection of the syncword has been made. If no syncword is found received and therefore the syncword detection may not be made, thereby failing injection locking, the reception processing block 205 returns to step B2 to continue the sweep processing of oscillation control voltage Vc. Upon confirming the existence of the syncword of 40 bits, the reception processing block 205 makes a syncword detection signal, not shown, active. In a state where a syncword has been detected and locking is on, the syncword detection signal is outputted to the reception-side control block 219. In FIG. 16, the syncword detection signal is indicated by a syncword signal D29.

Therefore, when the syncword detection signal has been outputted to the reception-side control block 219 and injection locking has been provided, the reception processing block 205 moves to step B4 to fix oscillation control voltage Vc based on free-running oscillation frequency frx at that moment after the injection locking control interval. Consequently, the wireless reception apparatus 200 can adjust the VCO block 204 by oscillation control voltage Vc based on the syncword detection processing to provide injection locking between the transmission and reception sides.

Variation 2

Figure 10:
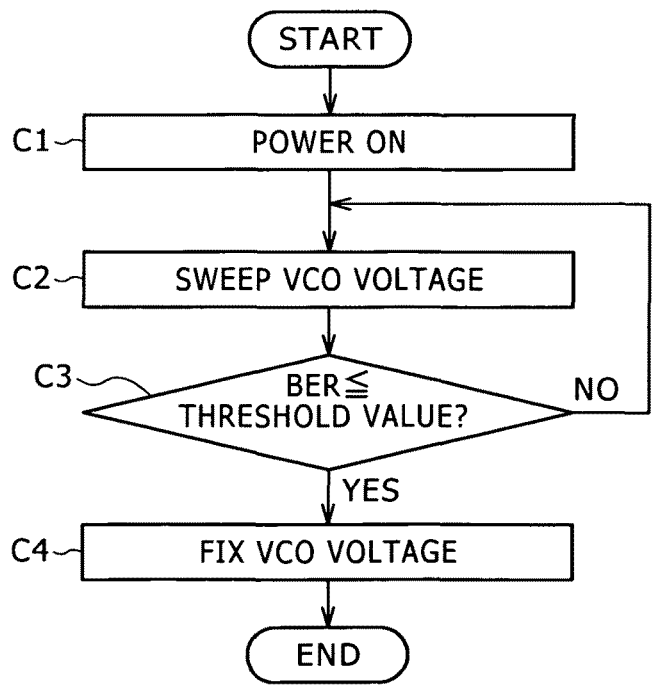
FIG. 10 is a flowchart indicative of an exemplary bit error detection processing at the time of injection locking control practiced as a second variation.

The following describes bit error detection processing to be executed at the time of injection locking control in the wireless reception apparatus 200 with reference to FIG. 10. In this example, the wireless reception apparatus 200 executes bit error detection processing during training interval. Bit error detection processing herein denotes the processing in which digital signal Din transmitted from the transmission side is demodulated and a bit error rate operation is executed, thereby computing a bit error rate.

For the bit error detection processing, a method is described below in which binary reception signal Sin' outputted from the comparison block 206 is used when the wireless reception apparatus 200 adjusts free-running oscillation frequency frx of the VCO block 204 to execute injection locking control. In this example, the wireless transmission apparatus 100 also superimposes digital signal Din on local oscillation signal Sf having local oscillation frequency ftx and transmits resultant transmission signal Sout to the reception side in order to provide locking during the training interval.

Under this control condition, upon detection of power ON information in step C1 shown in FIG. 10, the reception processing block 205 moves to step C2 to adjust oscillation control voltage Vc (or VCO voltage), thereby executing sweep processing. At this moment, the reception processing block 205 receives reception signal Sin based on digital signal Din while adjusting free-running oscillation frequency frx.

Next, the reception processing block 205 execute bit error detection processing in step C3 to determine whether injection locking has been provided, thereby branching control. At this moment, the reception processing block 205 receives reception signal Sin based on digital signal Din from the transmission side, for example, and computes a bit error rate (indicated by BER in the figure) of reception signal Sin, thereby determining, on the basis of the magnitude of the obtained bit error rate, whether injection locking has been provided or not.

In this example, if reception signal Sin based on digital signal Din may not be received and therefore the bit error rate becomes larger than threshold Eth (BER>Eth), thereby failing the provision of injection locking, the reception processing block 205 returns to step C2 and the reception-side control block 219 of the reception processing block 205 continues oscillation control voltage Vc sweep processing. For example, if the bit error rate becomes equal to or smaller than threshold Eth (BER≤Eth), thereby providing injection locking, then the reception baseband processing block 207 makes active the syncword signal D29 indicative of bit error non-detection.

In this example, if the bit error rate of reception signal Sin based on digital signal Din is small, thereby providing injection locking, the syncword signal D29 indicative of bit error non-detection is outputted from the reception baseband processing block 207 to the reception-side control block 219. The reception-side control block 219 outputs digital oscillation control data Dc for fixing oscillation control voltage Vc based on the syncword signal D29 to the DAC 208.

Therefore, when oscillation control data Dc has been outputted from the reception-side control block 219 to the DAC 208, thereby providing injection locking, the reception processing block 205 moves to step C4 to fix oscillation control voltage Vc by free-running oscillation frequency frx at that moment after injection locking control interval. Oscillation control voltage Vc is outputted from the DAC 208 to the VCO block 204.

Consequently, the wireless reception apparatus 200 can adjust free-running oscillation frequency frx of the VCO block 204 by oscillation control voltage Vc based on bit error detection processing to provide injection locking between the transmission and reception sides. It should be noted that the bit error rate computation requires the reception side for knowing digital signal Din that is transmitted from the transmission side. So, the transmission side may packetize digital signal Din and attach an error correction code (CRC) for example to the packetized digital signal. The reception side may use a packet error rate in place of a bit error rate to make confirmation of injection locking.

Variation 3

Figure 11:
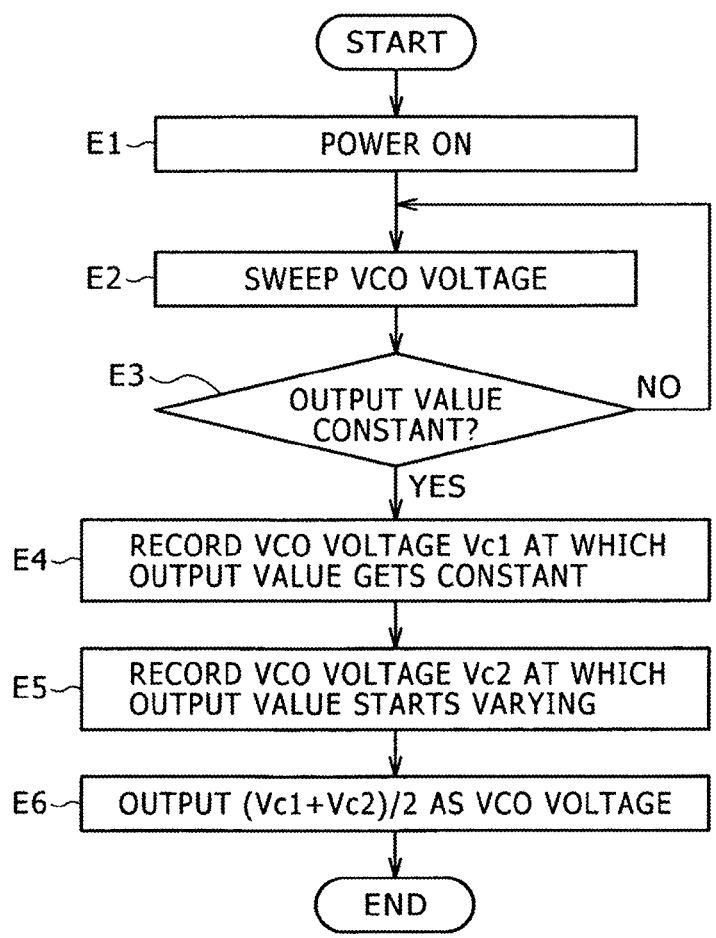
FIG. 11 is a flowchart indicative of exemplary digital signal Dout output value constant detection processing at the time of injection locking control practiced as a third variation.

The following describes an example of output value constant detection processing of digital signal Dout at the time of injection locking control in the wireless reception apparatus 200 with reference to FIG. 11. In this example, modulated signal S based on constant digital signal Din with the digits being all "0" or "1" is transmitted from the wireless transmission apparatus 100 and the wireless reception apparatus 200 adjusts free-running oscillation frequency frx of the VCO block 204 on the basis of the output value constant detection processing of digital signal Dout so as to control injection locking.

When modulated signal S based on constant digital signal Din has been transmitted, digital signal Dout that does not change for a certain period of time is outputted upon a match between local oscillation frequency ftx of the wireless transmission apparatus 100 and free-running oscillation frequency frx of the wireless reception apparatus 200 by injection locking. Therefore, it is seen that locking is provided in the state of free-running oscillation frequency frx with the output value of digital signal Dout becoming constant.

Further, a signal quality difference occurs due to phase difference $\Delta\phi$ to be described later in an output range of oscillation control voltage Vc in which the output value of digital signal Dout is almost constant. Therefore, if phase difference $\Delta\phi$ is known, a point at which phase difference $\Delta\phi$ disappears may be selected. If phase difference $\Delta\phi$ is unknown, a point at which phase difference $\Delta\phi$ disappear may further be searched for by the method to be described later.

In this example, a first oscillation control voltage Vc1 at which local oscillation signal Sf of the transmission side injected from the wireless transmission apparatus 100 almost matches local oscillation signal Sf of the reception side to provide an almost constant output value is detected and a second oscillation control voltage Vc2 at which the output value of digital signal Dout starts varying is detected. Then, an average value of oscillation control voltages Vc1 and Vc2 is computed. After injection locking, oscillation control voltage Vc of the midpoint obtained by the computation is outputted to be fixed.

Under this control condition, upon detection of power ON information in step E1 shown in FIG. 11, the reception processing block 205 moves to step E2 and adjusts oscillation control voltage Vc (VCO voltage) to execute sweep processing. At this moment, the reception processing block 205 sets oscillation control voltage Vc of the VCO block 204 to the lower limit value and raises oscillation control voltage Vc therefrom.

Because modulated signal Sb based on constant digital signal Din with a value thereof being all "0" or all "1" has been transmitted from the wireless transmission apparatus 100, the wireless reception apparatus 200 should also be able to receive almost constant digital signal Dout if injection locking is provided. The reception processing block 205 receives reception signal Sin based on digital signal Din while adjusting free-running oscillation frequency frx. If no locking is provided, reception signal Sin based on digital signal Din may not be demodulated, the reception processing block 205 continues the adjustment of free-running oscillation frequency frx.

When local oscillation signal Sf of the transmission side injected from the wireless transmission apparatus 100 matches local oscillation signal Sf of the reception side, the output value of digital signal Dout becomes constant as all "0" or all "1".

Therefore, the reception processing block 205 moves to step E3 to execute detection processing for detecting that the output value of digital signal Dout becomes constant to determine whether injection locking has been provided or not, upon which control is branched. In doing so, the reception processing block 205 receives reception signal Sin based on digital signal Din from the transmission side, outputs digital signal Dout based on reception signal Sin, and determines whether injection locking has been provided or not in accordance with an event in which the output value of this digital signal Dout becomes all "0" or all "1".

If an event in which the output value of digital signal Dout becomes all "0" or all "1" is detected, then the reception processing block 205 moves to step E4 and determines that locking has been provided because digital signal Dout having the same output value has continued. At this moment, the reception processing block 205 records first oscillation control voltage Vc1 as oscillation control voltage Vc at which the output value of digital signal Dout becomes constant.

Next, the reception processing block 205 moves to step E5 to further raise oscillation control voltage Vc. Then, the reception processing block 205 records second oscillation control voltage V2 as oscillation control (VCO) voltage Vc at which the output value digital signal Dout starts varying.

The reception processing block 205 moves to step E6 to compute an average value (V1+V2) of first oscillation control voltage V1 and second oscillation control voltage V2. After the injection locking control interval, the reception processing block 205 fixes oscillation control voltage Vc obtained by the computation. Oscillation control voltage Vc is outputted from the DAC 208 to the VCO block 204. Consequently, the wireless reception apparatus 200 can adjust free-running oscillation frequency frx of the VCO block 204 by oscillation control voltage Vc based on the output value constant detection processing of digital signal Dout to provide injection locking between the transmission and reception sides.

Figure 12:
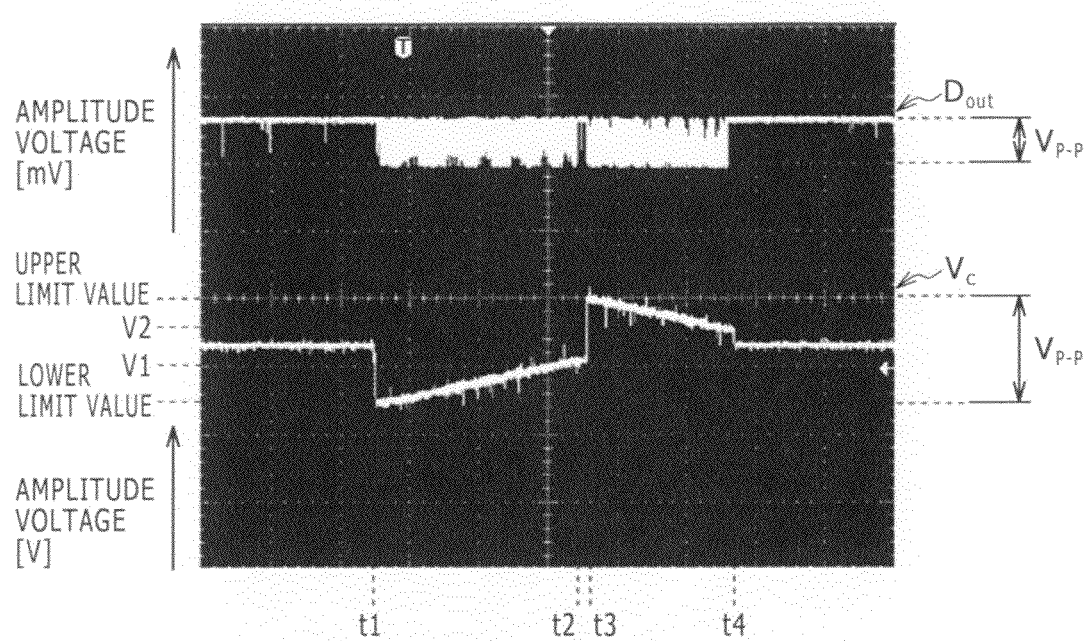
FIG. 12 is a diagram illustrating exemplary output waveforms of digital signal Dout and oscillation control voltage Vc.

The following describes exemplary output waveforms (or experiment results) of digital signal Dout and oscillation control voltage Vc with reference to FIG. 12. In FIG. 12, the horizontal axis is representative of time t and the vertical axis is representative of the amplitude (voltage) of each of digital signal Dout and oscillation control voltage Vc. Digital signal Dout is around 200 mV at VP-P. Oscillation control voltage is around 2.00 V at VP-P.

The output waveform examples shown in FIG. 12 are outputted from the reception processing block 205 obtained by outputting local oscillation signal Sf from the wireless transmission apparatus 100 shown in FIG. 2 to vary oscillation frequency Vc of the VCO block 204 of the wireless reception apparatus 200 shown in FIG. 4. In the waveform examples, the vibratory waveform line shown on top is indicative of digital signal Dout obtained by digitizing reception signal Sin outputted from the DOWNMIX block 201. The tooth-like waveform line at the bottom is indicative of oscillation control voltage Vc that is outputted from the VCO block 204.

In the above-mentioned example, a constant value with all "0" or all "1" is outputted from the transmission baseband processing block 102 of the wireless transmission apparatus 100 as digital signal Din. In a state where no locking is provided, the reception processing block 205 may not demodulate reception signal Sin based on digital signal Din, so that the reception processing block 205 continues the adjustment of free-running oscillation frequency frx. When modulated signal S of local oscillation frequency ftx injected from the transmission side matches local oscillation signal Sf of the reception side, the output value of digital signal Dout becomes constant like all "0" or all "1".

So, the reception processing block 205 executes detection processing for detecting that the output value of the digital signal Dout becomes almost constant. The reception processing block 205 sets oscillation control voltage Vc of the VCO block 204 at time t1 to the lower limit value and then raises oscillation control voltage Vc therefrom. Because modulated signal S based on digital signal Din with the value thereof being constant as all "0" or all "1" is being transmitted (or outputted) from the wireless transmission apparatus 100, the wireless reception apparatus 200 should also be able to receive digital signal Din having an almost constant output value if injection locking is provided.

The reception processing block 205 receives reception signal Sin based on digital signal Din while adjusting free running oscillation frequency frx. In a state where no injection locking is provided, reception signal Sin based on digital signal Din may not be demodulated, so that the reception processing block 205 continues the adjustment of free running oscillation frequency frx. If an event in which the output value of digital signal Dout becomes all "0" or all "1" is detected for a certain period of time (time t2 to t3 in the figure), the reception processing block 205 determines that locking has been provided because digital signal Dout having the same output value has continued. At time t2, the reception processing block 205 records first oscillation control voltage Vc1 as oscillation control voltage Vc at which the output value of digital signal Dout becomes constant.

Further, the reception processing block 205 sets oscillation control voltage Vc to the upper limit value and then lowers oscillation control voltage Vc therefrom. Then, the reception processing block 205 records second oscillation control voltage Vc2 as oscillation control voltage Vc of time t4 at which the output value of digital signal Dout becomes constant. In doing so, in the same manner as described above, the reception processing block 205 determines that locking is provided when digital signal Dout having the same output value has continued for an almost certain interval, storing oscillation control voltage Vc obtained at time t4 as second oscillation control voltage Vc2.

The control operation as described above can obtain oscillation control voltage Vc=V1 on the basis of the lower limit value setting in the locking range of the VCO block 204. Because oscillation control voltage Vc2 can be obtained on the basis of the upper limit value setting of this locking range, locking can be provided by setting the average value of Vc1 and Vc2 to the VCO block 204 as oscillation control voltage Vc.

It should be noted that the locking range can be obtained from equation (7) below:

$$\Delta\omega_m = \frac{\rho\omega_0}{2\alpha Q} \quad (7)$$

In a locked state, equation (8) below is established:

$$\frac{d\phi}{dt} = O \quad (8)$$

In the above-mentioned experiment results, the variation of oscillation control voltage Vc of the VCO block 204 is constant; however, it is also practicable to vary the variation of oscillation control voltage Vc depending on the length of time in which the same digital signal Dout continues. It should be noted that, in the above description, the average value of the first and second oscillation control voltage V1 and V2 is oscillation control voltage Vc of the VCO block 204; however, depending on phase difference Δφ, the average value of the first and second oscillation control voltage V1 and V2 does not become optimum oscillation control voltage Vc. In order to circumvent this problem, a method of controlling the injection locking corresponding to the frequency difference (ftx−frx) of local oscillation signal Sf of the transmission side is proposed.

Figure 13:
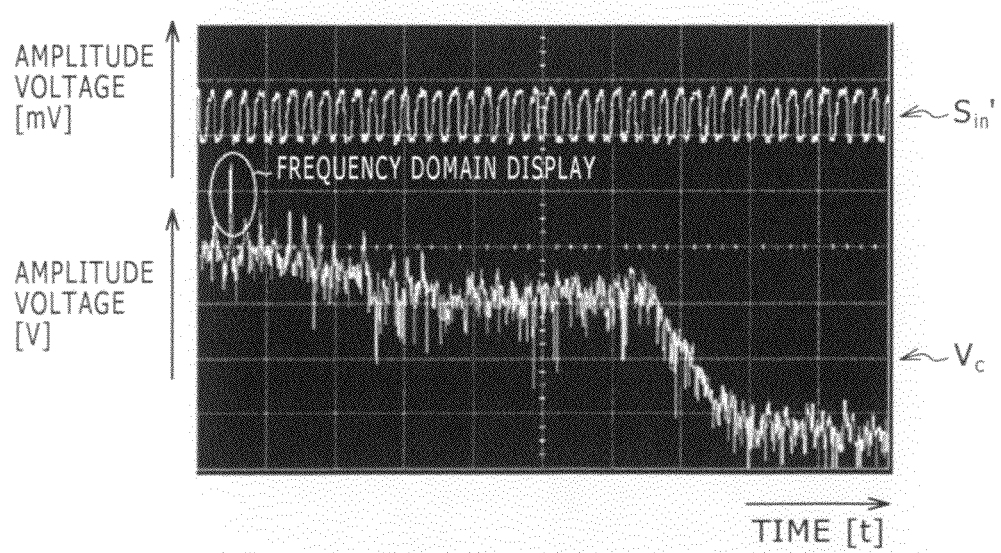
FIG. 13 is a diagram illustrating exemplary waveforms showing exemplary injection locking control for a frequency difference (large) of local oscillation signal Sf on the transmission and reception sides.
Figure 14:
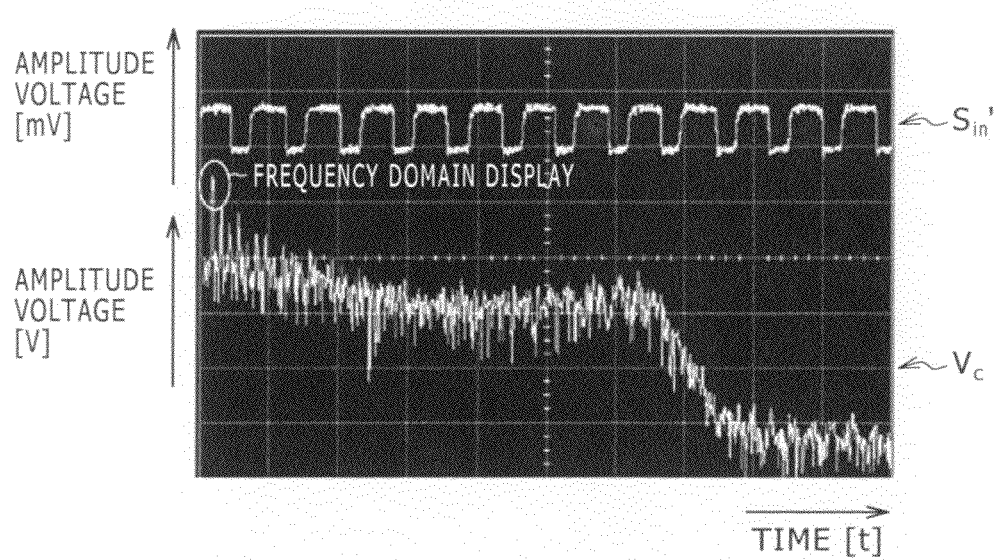
FIG. 14 is a diagram illustrating exemplary waveforms showing exemplary injection locking control for a frequency difference (small) of local oscillation signal Sf on the transmission and reception sides.

The following describes one example of injection locking control corresponding to frequency difference f∈ (large and small) of the local oscillation signal Sf of the transmission side with reference to FIG. 13 and FIG. 14. A waveform example shown in the upper half of FIG. 13 is representative of binary reception signal Sin' outputted from the comparison block 206 when the output of the oscillation control voltage Vc of the VCO block 204 is adjusted (or varied) if the frequency difference (ftx−frx) of local oscillation signals Sf of the transmission and reception sides is relatively large. A waveform example shown in the lower half of the figure is obtained by executing FFT (Fast Fourier Transform) on oscillation control voltage Vc at that moment. A portion enclosed by an ellipse is indicative of a frequency range of oscillation control voltage Vc after the FFT processing.

The waveform example shown in FIG. 14 is indicative of binary reception signal Sin' outputted from the comparison block 206 when the frequency difference (ftx−frx) between the transmission side and the reception side is relatively small and the output of oscillation control voltage Vc of the VCO block 204 has been adjusted. The waveform example shown in the lower half of the figure is obtained by executing FFT (Fast Fourier Transform) on oscillation control voltage Vc at that moment. A portion enclosed by an ellipse is indicative of a frequency range of oscillation control voltage Vc after the FFT processing.

These two waveform examples are indicative that the frequency difference (ftx−frx) between local oscillation frequency ftx of the wireless transmission apparatus 100 shown in FIG. 2 and free running oscillation frequency frx of the wireless reception apparatus 200 shown in FIG. 4 is relatively large. In this case, as shown in equation (5) above, the frequency of binary reception signal Sin' outputted from the comparison block 206 gets relatively large.

This is caused when oscillation control voltage Vc shown in FIG. 13 is lower than oscillation control voltage Vc shown in FIG. 14. As a result, the waveform example shown in FIG. 13 is larger than the waveform example shown in FIG. 14 in the frequency difference (ftx−frx) between the transmission and reception sides.

As clearly seen from the experiment results shown in FIG. 13, this phenomenon occurs when the frequency difference (ftx−frx) between local oscillation frequency ftx of the transmission side and free running oscillation frequency frx of the reception side is relatively large. This phenomenon can be confirmed when the frequency of binary reception signal Sin' outputted from the comparison block 206 rises. In contrast, if the frequency difference (ftx−frx) between local oscillation frequency ftx of the transmission side and free running oscillation frequency frx of the reception side is relatively small, this phenomenon can be confirmed when the frequency of binary reception signal Sin' outputted from the comparison block 206 lowers.

In this example, the frequency of binary reception signal Sin' can be known by counting the number of edges of binary reception signal Sin' outputted from the comparison block 206. On the basis of the obtained value, frequency difference (ftx−frx) between local oscillation frequency ftx of the wireless transmission apparatus 100 and free running oscillation frequency frx of the wireless reception apparatus 200 can be computed. Therefore, on the basis of the frequency difference (ftx−frx) between local oscillation frequency ftx of the wireless transmission apparatus 100 and free running oscillation frequency frx of the wireless reception apparatus 200, oscillation control voltage Vc of the VCO block 204 can be controlled.

Figure 15:
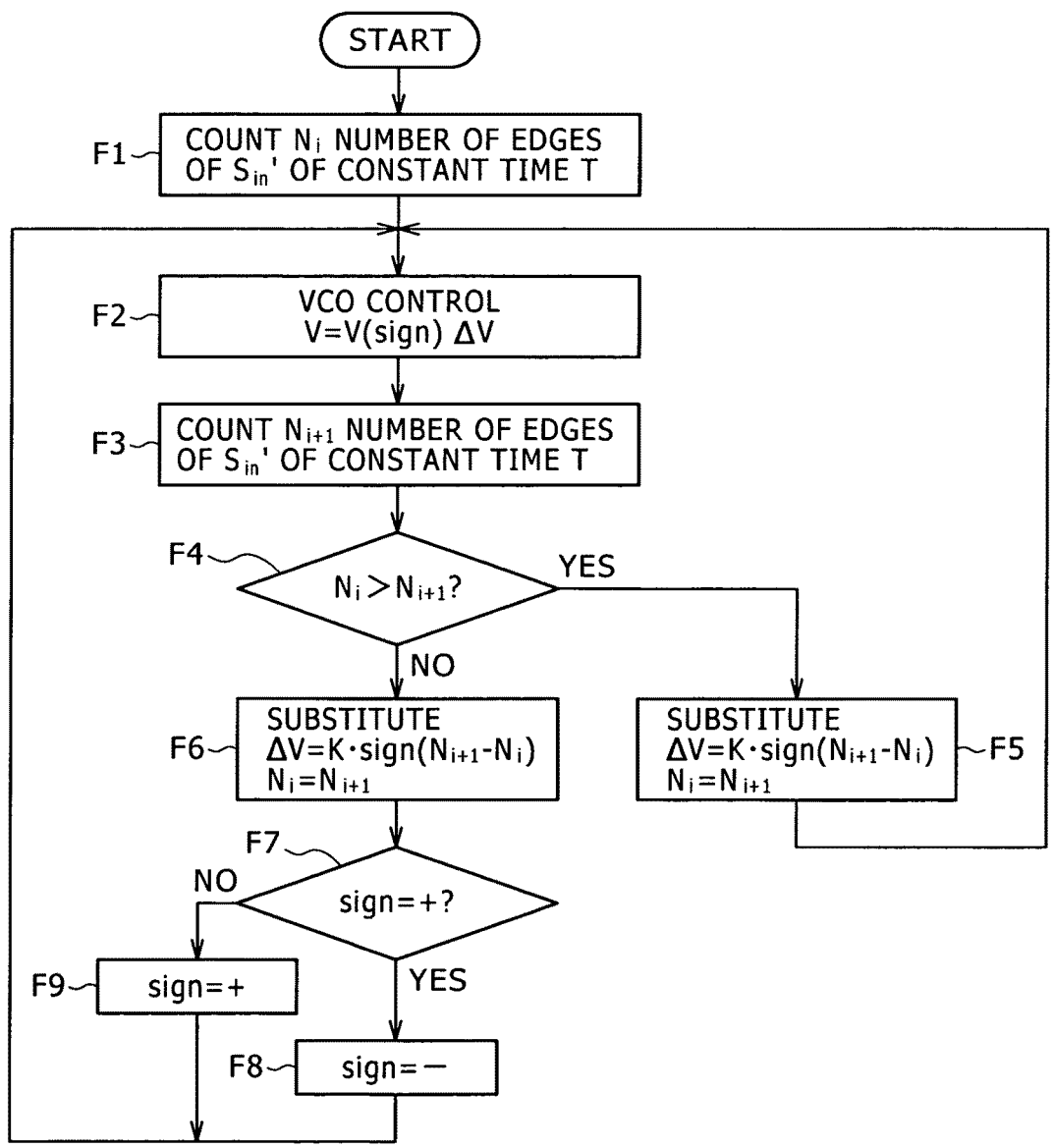
FIG. 15 is a flowchart indicative of exemplary control of oscillation control voltage Vc by the number of edges of binary reception signal Sin'.

The following describes a control example of oscillation control voltage Vc based on the number of edges of binary reception signal Sin' in the reception processing block 205 with reference to FIG. 15. In this example, the number of edges of binary reception signal Sin' is counted by the reception processing block 205, the DAC 208 is controlled by the reception-side control block 219 on the basis of the obtained count, and voltage variation ΔV of oscillation control voltage Vc outputted from the DAC 208 is adjusted to control the VCO block 204. For example, let the voltage variation be ΔV and a frequency difference for a certain period of time be Ni (I=0, 1, 2, . . . ), then voltage variation ΔV is computed by equation (9) below (hereafter referred to as a voltage variation equation):

$$\Delta V = K \cdot \text{sign}(N_{i+1} - N_i) \quad (9)$$

In equation (9) above, K denotes a coefficient. In this feedback control example, this voltage variation ΔV is fed back to the VCO block 204.

Under this control condition, the reception baseband processing block 207 counts the number of edges of binary reception signal Sin' outputted from the comparison block 206 in step F1 shown in FIG. 15. Next, in step F2, the reception-side control block 219 adjusts oscillation control voltage Vc of the VCO block 204 by use of equation (9) above, the voltage variation equation. At this moment, the reception-side control block 219 of the reception side varies oscillation control voltage Vc of the VCO block 204 by sign(+/−sign) from the current value.

Further, in step F3, the reception baseband processing block 207 counts the number of edges of binary reception signal Sin' outputted from the comparison block 206. In step F4, the reception processing block 205 determines whether frequency difference Ni+1 for a certain period of time is smaller than frequency difference Ni. If frequency difference Ni+1 for a certain period of time is found to be smaller than frequency difference Ni, then, in step F5, the reception-side control block 219 substitutes Ni and Ni+1 into voltage variation equation (9) to compute voltage variation ΔV and then substitutes Ni+1 into Ni in preparation for a next computation. At this moment, frequency difference Ni+1 has gotten relatively small, thereby indicating that the variation direction of oscillation control voltage Vc of the VCO block 204 and the variation direction of frequency difference Ni+1 are correct. Therefore, sign of the voltage variation equation (9) remains unchanged.

If frequency difference Ni+1 is found in step F4 to be larger than frequency difference Ni, then it indicates that the variation direction of oscillation control voltage Vc of the VCO block 204 and the variation direction of frequency difference Ni+1 are opposite to each other. Therefore, the reception-side control block 219 moves to step F6 substitutes Ni and Ni+1 into equation (9) to compute voltage variation ΔV and then substitutes Ni+1 into Ni in preparation for a next computation.

Then, the reception-side control block 219 moves to step F7 to determine sign of the above-mentioned voltage variation equation. If sign of the voltage variation equation is found to be "+", then the reception-side control block 219 moves to step F8 to convert sign "+" to sign "−". Then, the reception-side control block 219 returns to step F2. If sign is found in step F7 to be "−", then the reception-side control block 219 moves to step F9 to convert sign "−" to sign "+".

Then, the reception-side control block 219 returns to step F2 to vary oscillation control voltage Vc of the VCO block 204 by sign ΔV from the current value. Then, steps F3 through F9 are repeated. In the example mentioned above, equation (9) is used for a function of determining voltage variation ΔV of oscillation control voltage Vc; however, other functions may be used for this purpose.

As described above, according to the wireless reception apparatus 200 practiced as the second embodiment of the invention, the wireless reception block 201 first adjusts free running oscillation frequency frx of local oscillation signal Sf concerned so as to match local oscillation signal Sf of the transmission side injected therefrom into the VCO block 204 with local oscillation signal Sf of the reception side during the training interval, thereby providing injection locking. Next, the wireless reception block 201 receives digital signal Dout from the transmission side after the injection locking control interval.

Therefore, local oscillation signal Sf of local oscillation frequency ftx of the transmission side can be injection in the VCO block 204 of the reception side by the injection locking that regards the wireless transmission apparatus 100 as an external circuit. This allows the locking of local oscillation signal Sf of the wireless reception apparatus 200 concerned with local oscillation signal Sf of the wireless transmission apparatus 100 during the training interval. Consequently, this configuration allows any wireless signal transmission system that uses the VCO block 204 in which the range of local oscillation frequency ftx of the reception side fluctuates due to manufacturing fluctuations, temperature environment variations, or the like to surely execute injection locking. And, because external circuits, such as a PLL circuit for free-running oscillation frequency locking and an external circuit for injection locking are required no more, the circuit scale of the system can be reduced, leading to significant power saving.

(4) The Third Embodiment

A Millimeter-Wave Transmission System 30

The following describes a millimeter-wave transmission system 30 practiced as the third embodiment of the invention with reference to FIG. 16. The third embodiment is the millimeter-wave transmission system 30 in which a wireless transmission apparatus 100 shown in FIG. 2 and a wireless reception apparatus 200 shown in FIG. 4 can communicate with each other on a one-to-one basis.

The millimeter-wave transmission system 30 shown in FIG. 16 makes up one example of a wireless communication system in which the wireless transmission apparatus 100 shown in FIG. 1 and the wireless reception apparatus 200 shown in FIG. 4 communicate with each other on a one-to-one basis. The wireless transmission apparatus 100 has a VCO block 107 for oscillating local oscillation signal Sf, modulates digital signal Din, and transmits modulated signal S to the transmission side. An output terminal 116 of the wireless transmission apparatus 100 is connected to an antenna member 117. The antenna member 117 is based on a patch antenna, a probe antenna (such as a dipole), a loop antenna, or a small-size aperture coupling element (such as a slot antenna), for example.

The wireless reception apparatus 200 has a VCO block 204 for oscillating local oscillation signal Sf, receives modulated signal S from the transmission side, and demodulates received digital signal Dout. An input terminal 211 of the wireless reception apparatus 200 is connected to an antenna member 217. The antenna member 217 is similarly implemented as with the wireless transmission apparatus 100. It should be noted that, for an internal configuration of the wireless transmission apparatus 100, refer to FIG. 2 and, for an internal configuration of the wireless reception apparatus 200, refer to FIG. 4.

The antenna member 117 and the antenna member 217 on the transmission and reception side are arranged in an electromagnetic wave transmission media 21. For the electromagnetic wave transmission media 21, a dielectric transmission path is used, in addition to the air or vacuum media. The dielectric transmission path is configured by a dielectric material that can transmit electromagnetic waves based on a millimeter wave signal. For the dielectric material, a glass epoxy resin having dielectric constant ∈1 is used, for example. In addition, a member made up of acryl, urethane resin, epoxy resin, silicone, or polyimide, for example. It should be noted that the electromagnetic transmission media 21 fills up a housing 3 shown in FIG. 1.

In the millimeter-wave transmission system 30 of this example, the wireless transmission apparatus 100 injects local oscillation signal Sf of the transmission side into the VCO block 204 of the reception side during a training interval. The wireless reception apparatus 200 adjusts the oscillation frequency of the signal concerned so as to match local oscillation signal Sf of the transmission side injected from the wireless transmission apparatus 100 with local oscillation signal Sf of the reception side, thereby providing injection locking. During the communication interval after the injection locking, the wireless transmission apparatus 100 transmits digital signal Din to the wireless reception apparatus 200.

The following describes a wireless communication method used in the millimeter-wave transmission system 30 with reference to FIG. 17 through FIG. 20. According to a first communication example shown in FIG. 7A, training interval T1 and training interval T2 are defined in the millimeter-wave transmission system 30 made up of the wireless transmission apparatus 100 and the wireless reception apparatus 200 shown in FIG. 16. In training interval T1, injection locking control is executed. In training interval T2, data can be transmitted between the transmission and reception sides after completion of the injection locking.

According to the first communication example, injection locking control is once executed and, after completion of injection locking, injection locking control is not executed. In contrast, according to the second communication example shown in FIG. 17B, injection locking control is executed regularly or irregularly after completion of injection locking. In the second example, every time injection locking is completed, data is transmitted from the transmission side to the reception side. With the millimeter-wave transmission system 30, any one of the first and second communication examples may be used.

Figure 18:
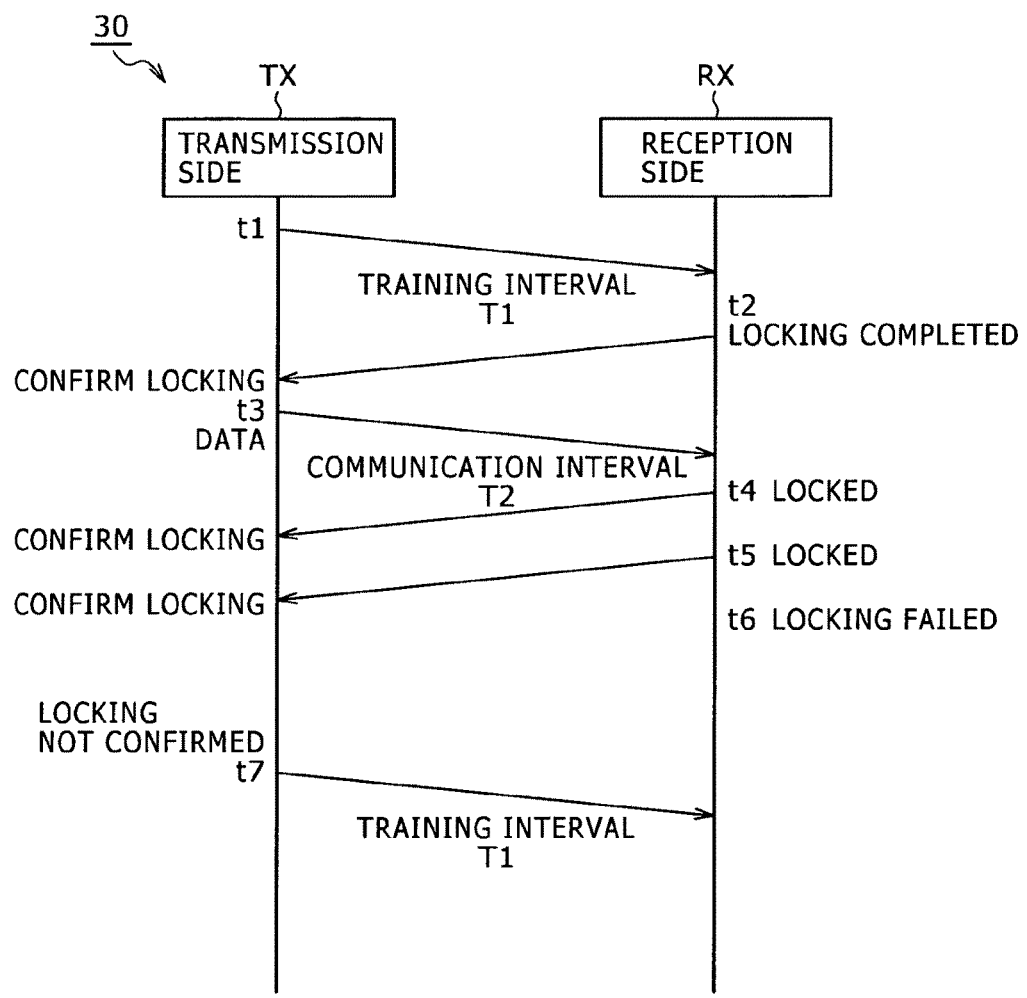
FIG. 18 is a sequence diagram illustrating exemplary injection locking control at the time of bidirectional communication in the millimeter wave transmission system.
Figure 19:
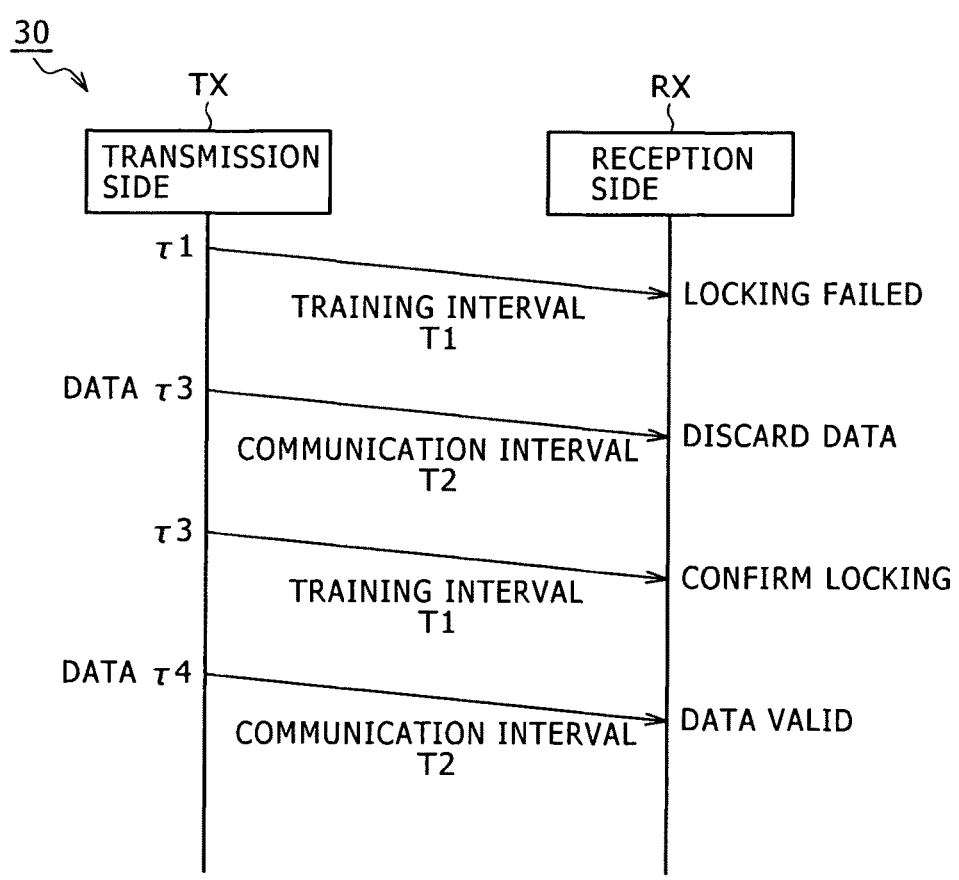
FIG. 19 is a sequence diagram illustrating exemplary injection locking control at the time of unidirectional communication in the millimeter wave transmission system.

The following describes injection locking control examples in bidirectional and unidirectional communication examples with reference to FIG. 18 and FIG. 19.

Example of Bidirectional Communication

In a bidirectional communication example shown in FIG. 18, in the millimeter-wave transmission system 30, a response to information obtained in the wireless reception apparatus 200 can be fed back to the wireless transmission apparatus 100. Obviously, the wireless transmission apparatus 100 has a wireless reception block 201 and a reception processing block 205 shown in FIG. 4. The wireless reception apparatus 200 has a transmission processing block 101 and a wireless transmission block 104 shown in FIG. 2.

On these premises, training interval T1 is set at time t1 at which transmission side TX (the wireless transmission apparatus 100) started communication as shown in FIG. 18. Reception side RX (the wireless reception apparatus 200) replies a notification of "locking completed" to transmission side TX at time t2 at which injection locking has been provided. Upon "locking confirmed" by transmission side TX, transmission side TX sets communication interval T2 at time t3 and transmits data to reception side RX. In this example, "locking completed" is regularly transmitted from reception side RX to transmission side TX at times t4 and t5.

It should be noted that, if an out-of-locking state has been detected on the reception side RX and locking has not been provided for a certain period of time from time t6, thereby disabling the transmission side TX to confirm locking, then the transmission side TX sets training interval T1 at time t7 to execute injection locking control. Consequently, every time injection locking is completed, digital signals (hereafter referred to also as data) can be transmitted from the transmission side TX to the reception side RX.

Example of Unidirectional Communication

According to a unidirectional communication example shown in FIG. 19, in the millimeter-wave transmission system 30, a response to the information obtained in the wireless reception apparatus 200 may not be fed back to the wireless transmission apparatus 100. So, training interval T1 and communication interval T2 are regularly repeated. Obviously, training interval T1 may be set to communication interval T2 after the injection locking control interval to provide injection locking.

In FIG. 19, at time T1 at which the transmission side TX (the wireless transmission apparatus 100) stated communication, training interval T1 is set. Injection locking is not provided on the reception side RX (the wireless reception apparatus 200) and the transmission side TX sets communication interval T2 at time t2 and transmits data to the reception side RX. In this example, the data from the transmission side TX to the reception side RX during communication interval T2 set without injection locking is discarded.

Then, training interval T1 is set again at time T3. When injection locking has been provided and confirmed on the reception side RX (the wireless reception apparatus 200), the transmission side TX sets communication interval T2 at time t4, transmitting data to the reception side RX. In this example, because injection locking has been provided, the data transmitted from the transmission side TX to the reception side RX during the communication interval T2 concerned is handled as valid. Consequently, every time injection locking is successful, data can be transmitted from the transmission side TX to the reception side RX.

Because the wireless reception apparatus 200 can confirm whether locking has been provided or not, the data during communication interval T2 without locking is discarded. The data during communication interval T2 after locking has been confirmed is made valid. It should be noted that, in any of the injection locking control examples shown in FIG. 18 and FIG. 19, an output power of the wireless transmission apparatus 100 may increased during training interval T1 as with the power control example shown in FIG. 3 and the output power may be returned to a normal level in communication interval T2.

A Wireless Communication Method

Figure 20:
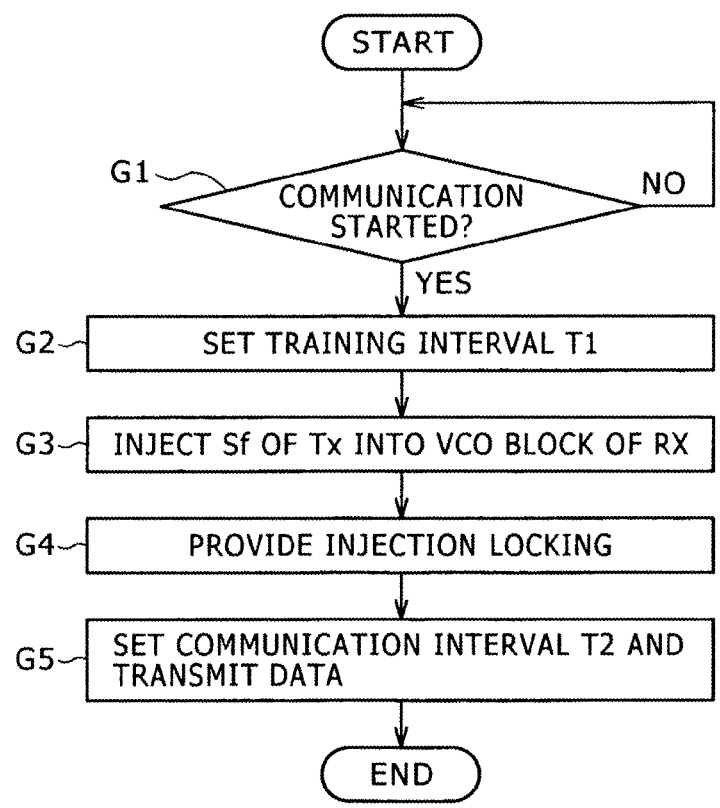
FIG. 20 is a flowchart indicative of exemplary wireless communication in the millimeter wave transmission system.

The following describes a wireless communication method practiced as one embodiment of the invention with reference to FIG. 20. In what follows, the millimeter-wave transmission system 30 in which the wireless transmission apparatus 100 and the wireless reception apparatus 200 shown in FIG. 16 can communicate with each other on a one-to-one basis is taken by way of example.

In this example, the wireless transmission apparatus 100 waits for a command of starting communication in step G1 in the flowchart shown in FIG. 20. The communication start command is entered from a user tool to the transmission processing block 101 via an upper digital processing block, for example. When the communication start command is entered, the wireless transmission apparatus 100 sets training interval T1 in step G2 (refer to FIGS. 17 through 19). Then, in step G3, the wireless transmission apparatus 100 injects local oscillation signal Sf of the transmission side TX into the VCO block 204 of the reception side RX during training interval T1 (refer to FIGS. 2 and 3).

In step G4, the wireless reception apparatus 200 adjusts free running oscillation frequency frx of local oscillation signal Sf so as to match the injected local oscillation signal Sf of the transmission side TX with local oscillation signal Sf of the reception side RX, thereby providing injection locking. For example, the wireless reception apparatus 200 first detects frequency difference f∈ between local oscillation signal Sf of the transmission side TX injected from the wireless transmission apparatus 100 and local oscillation signal Sf of the reception side RX during training interval T1. Next, the wireless reception apparatus 200 adjusts oscillation control voltage Vc of the VCO block 304 in the direction in which this frequency difference f∈ becomes small, thereby providing injection locking (refer to FIGS. 4 through 14).

Next, in step G5, the wireless transmission apparatus 100 sets communication interval T2 after the injection locking control interval and transmits digital signal Din to the wireless reception apparatus 200 in this communication interval T2. Consequently, every time injection locking has been completed or every time injection locking is successful, digital signal Din can be transmitted from the transmission side TX to the reception side RX.

As described above, the millimeter-wave transmission system 30 has the wireless transmission apparatus 100 and the wireless reception apparatus 200. This configuration allows the injection of local oscillation signal Sf of local oscillation frequency ftx of the transmission side into the VCO block 204 of the reception side by the injection locking regarding the wireless transmission apparatus 100 as an external circuit. In the millimeter-wave transmission system 30, local oscillation signal Sf of the wireless transmission apparatus 100 and local oscillation signal Sf of the wireless reception apparatus 200 can be locked with each other during training interval T1. And, the injection locking processing can be executed even with the millimeter-wave transmission system 30 using the VCO block 204 in which the local oscillation frequency range of local oscillation signal Sf is fluctuating due to the fluctuation in manufacturing and the variation in temperature environment, for example.

It should be noted that a monitor-dedicated wireless reception apparatus may be arranged separate from the wireless reception apparatus 200 to dedicatedly monitor the state of injection locking processing through this wireless reception apparatus. In this case, the reception baseband processing block 207 of the reception processing block 205 determines the state of injection locking processing on the basis of information obtained from the wireless reception block 201 of the wireless reception apparatus 200 or from the reception processing block 205, for example, or information obtained from the monitor-dedicated wireless reception apparatus. The reception processing block 205 controls the wireless transmission block 104 or the wireless reception block 201 of the wireless transmission apparatus 100 to provide locking between local oscillation frequency ftx of the wireless transmission apparatus 100 and free running oscillation frequency frx of the wireless reception apparatus 200.

(5) The Fourth Embodiment

Figure 21:
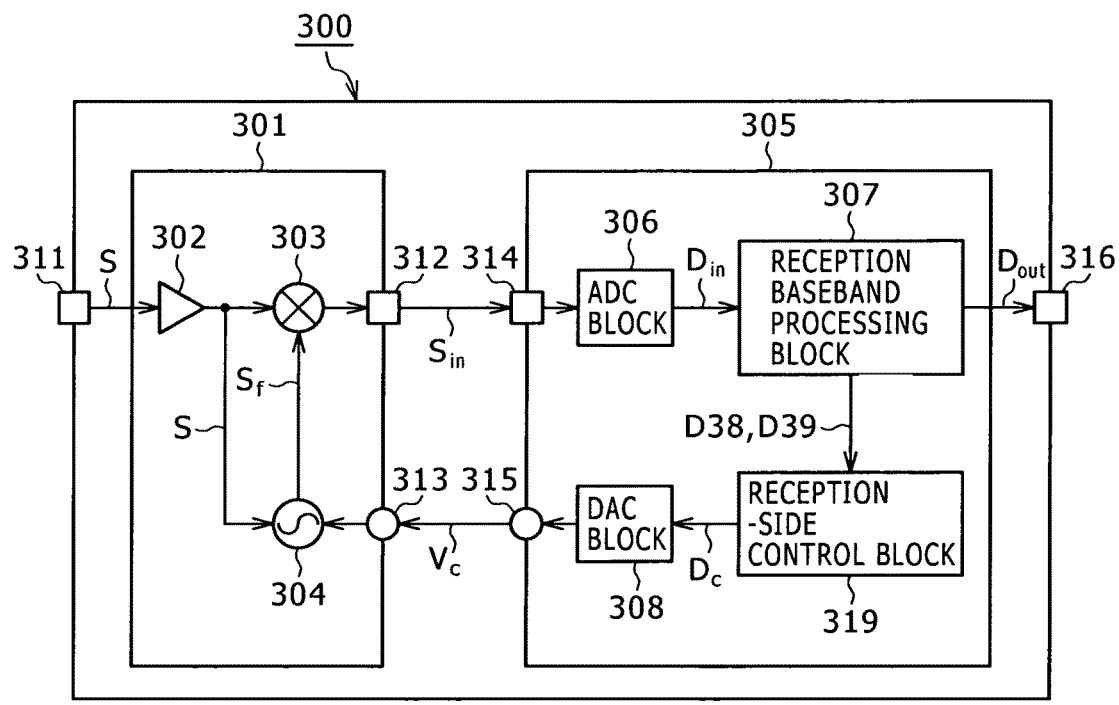
FIG. 21 is a block diagram illustrating an exemplary configuration of a wireless reception apparatus practiced as a fourth embodiment of the invention.
Figure 22:
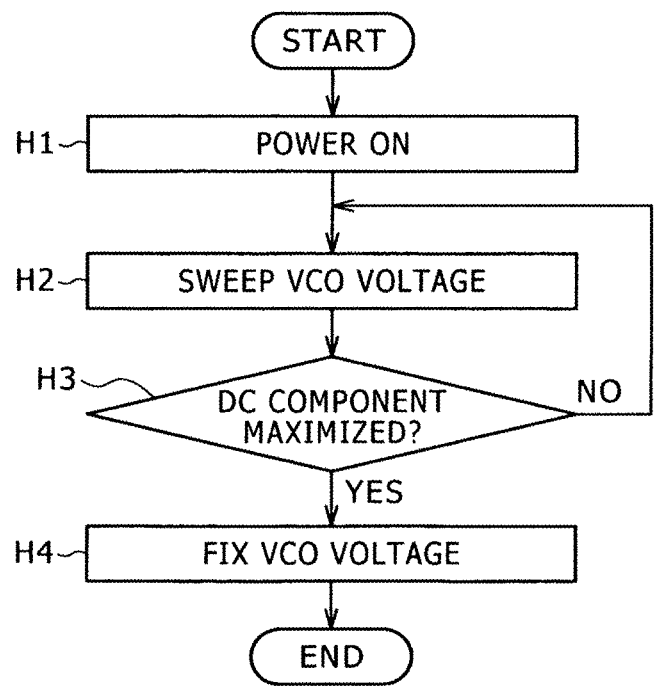
FIG. 22 is a flowchart indicative of exemplary injection locking control in the wireless reception apparatus.

The following describes an exemplary configuration of a wireless reception apparatus 300 practiced as the fourth embodiment of the invention with reference to FIG. 21 and FIG. 22. In the fourth embodiment, the comparison block 206 of the wireless reception apparatus 200 shown in FIG. 4 is replaced by an analog-to-digital converter (hereafter referred to an ADC) 306. With the wireless reception apparatus 300, the output of the ADC 306 is processed by a reception baseband processing block 307 to fix free running oscillation frequency frx of a VCO block 304 to local oscillation frequency ftx of a wireless reception block 301 when the direct current component of reception signal Sin is maximized.

The wireless reception apparatus 300 shown in FIG. 21 has the wireless reception block 301 and a reception processing block 305. The wireless reception block 301 first adjusts free running oscillation frequency frx of local oscillation signal Sf concerned so as to match modulated signal S having local oscillation frequency ftx injected from the transmission side with local oscillation signal Sf of the reception side during training interval T1, thereby providing injection locking. Next, the wireless reception block 301 receives digital signal Din from the transmission side during the communication interval after the injection locking.

The wireless reception block 301 is configured by an LNA block 302, a DOWNMIX block 303, and the VCO block 304. In addition to these component blocks, the wireless reception block 301 has input terminals 311 and 313 and an output terminal 312. The wireless reception block 301 receives modulated signal S (or an electromagnetic wave based on a millimeter wave signal) from the transmission side via an antenna member, not shown, to demodulate reception signal Sin on the basis of local oscillation signal Sf oscillated by the VCO block 304.

The input terminal 311 is connected to an antenna member, not shown, and to the LNA block 302. The LNA block 302 amplifies modulated signal S received from the transmission side. The LNA block 302 is connected to the DOWNMIX block 303 and the VCO block 304. The VCO block 304 oscillates local oscillation signal Sf having free running oscillation frequency frx on the basis of oscillation control voltage Vc. The DOWNMIX block 303 demodulates reception signal Sin from modulated signal S amplified by the LNA block 302, on the basis of local oscillation signal Sf of the VCO block 304 controlled by a DAC block 308 of the reception processing block 305.

The above-mentioned output terminal 312 of the wireless reception block 301 is connected to the reception processing block 305. The reception processing block 305 digitally processes reception signal Sin outputted from the wireless reception block 301 to output digital signal Dout. The reception processing block 305 is configured by the ADC 306, the reception baseband processing block 307, the DAC block 308, and a reception side control block 319. The reception processing block 305 has an input terminal 314 and output terminals 315 and 316 in addition to the above-mentioned component blocks. The above-mentioned output terminal 312 is connected to the input terminal 314 of the reception processing block 305.

The input terminal 314 is connected to the ADC 306. The ADC 306 analog-to-digital converts reception signal Sin outputted from the wireless reception block 301 to output resultant digital signal Din. The ADC 306 is based on a multi-bit analog-to-digital converter.

The ADC 306 is connected to the reception baseband processing block 307. The reception baseband processing block 307 digitally processes digital signal Din outputted from the ADC 306 to output direct current component data D39 of reception signal Sin during training interval T1. The reception baseband processing block 307 digitally processes reception signal Sin to demodulate digital signal Dout and outputs resultant digital signal Dout to an upper digital processing block through the output terminal 316 during the communication interval T2. The reception baseband processing block 307 is connected to the reception side control block 319. The reception side control block 319 generates oscillation control data Dc from the direct current component data D39.

The reception side control block 319 is connected to the DAC block 308. The DAC block 308 converts oscillation control data Dc outputted from the reception side control block 319 into analog oscillation control voltage Vc. The above-mentioned output terminal 315 of the reception processing block 305 is connected to the input terminal 313 of the wireless reception block 301. Oscillation control voltage Vc is outputted (or fed back) to the VCO block 304 via the output terminal 315 and the input terminal 313.

In this example, the reception processing block 305 controls the output of the VCO block 304 on the basis of oscillation control voltage Vc outputted from the DAC block 308. For example, the reception processing block 305 executes direct current component maximum value detection processing in training interval T1 to adjust oscillation control voltage Vc of the VCO block 304 on the basis of this processing for providing injection locking, thereby fixing oscillation control voltage Vc after the injection locking. The direct current component maximum value detection processing denotes the processing of detecting the direct current component maximum value of reception signal Sin.

Configuring the wireless reception block 301 and the reception processing block 305 as described above allows the outputting of oscillation control voltage Vc from the DAC block 308 to the VCO block 304, thereby controlling the output of the VCO block 304 on the basis of oscillation control voltage Vc. As a result, during training interval T1, free running oscillation frequency frx of local oscillation signal Sf of the wireless reception apparatus 300 concerned can be injection-locked with local oscillation frequency ftx of local oscillation signal Sf of the transmission side.

The following describes an injection locking control example in the wireless reception apparatus 300 with reference to FIG. 22. In this example, the wireless reception apparatus 300 executes the processing of detecting the maximum value of direct current component of reception signal Sin during training interval T1. This direct current component maximum value processing denotes the processing of detecting a maximum value at which the value of direct current component data D39 based on reception signal Sin outputted from the wireless reception block 301 is maximized.

In the maximum value detection processing, it is assumed that reception signal Sin outputted from the wireless reception block 301 be analog-to-digital converted by the ADC 306 to control the VCO block 304 on the basis of the direct current component data D39 obtained by digitally processing digital signal Din outputted from the ADC 306 concerned. In the injection locking control, free running oscillation frequency frx of the VCO block 304 of the wireless reception block 301 is adjusted in the direction in which phase difference $\Delta\theta$ is minimized.

Under this control condition, upon detection of power ON information in step H1 shown in FIG. 22, the reception processing block 305 moves to step H2 to adjust oscillation control voltage Vc (VCO voltage), thereby executing sweep processing. At this moment, while adjusting free running oscillation frequency frx, the reception processing block 305 receives reception signal Sin. In the state where no locking has been provided, phase difference $\Delta\theta$ is relatively large and the direct current component of reception signal Sin may not be detected, so that the reception processing block 305 continues adjusting free running oscillation frequency frx.

In step H3, the reception processing block 305 executes maximum value detection processing of the direct current component data D39 to determine whether injection locking has been provided or not, upon which control is branched. This determination is done on the basis of whether the maximum value of the direct current component data D39 is above a predetermined constant value.

If reception signal Sin could not be received and the detection thereof could not be done, leading to failed injection locking, then the reception processing block 305 returns to step H2 to continue the sweep processing of oscillation control voltage Vc. When the maximum value of the direct current component data D39 has been confirmed, the reception processing block 305 stores oscillation control data Dc at the time of the confirmation of the maximum value into memory.

If the maximum value of the direct current component data D39 has been detected and injection locking is provided, the reception processing block 305 moves to step H4 to output the oscillation control data Dc at the time of the detection of the maximum value of the direct current component data D39 stored before to the DAC block 308, thereby fixing oscillation control voltage Vc so as to provide the free running oscillation frequency frx at the time at which the maximum value of the direct current component has been detected. Consequently, the wireless reception apparatus 300 can adjust the VCO block 304 by oscillation control voltage Vc based on the direct current component maximum value detection processing to provide injection locking between the transmission and reception sides.

According to the wireless reception apparatus 300 practiced as the fourth embodiment, the reception processing block 305 has the ADC 306 and, in the reception processing block 305, digital signal Din outputted from the ADC 306 is processed by the reception baseband processing block 307. Then, free running oscillation frequency frx of the 304 is fixed to free running oscillation frequency frx of the wireless reception block 301 at the time at which the value of the direct current component data D39 based on the digital signal Din is maximized.

Consequently, the injection locking with the wireless transmission apparatus 100 regarded as an external circuit allows the injection of local oscillation signal Sf having local oscillation frequency ftx of the transmission side into the VCO block 204 of the reception side. This configuration allows the locking of local oscillation signal Sf of the wireless reception apparatus 300 concerned with local oscillation signal Sf of the wireless transmission apparatus 100 during training interval T1. Consequently, this configuration allows any wireless signal transmission system that uses the VCO block 304 in which the range of local oscillation frequency ftx of the reception side fluctuates due to manufacturing fluctuations, temperature environment variations, or the like to surely execute injection locking. And, because external circuits, such as a PLL circuit for free-running oscillation frequency locking and an external circuit for injection locking are required no more, the circuit scale of the system can be reduced, leading to significant power saving.

(6) The Fifth Embodiment

Figure 23:
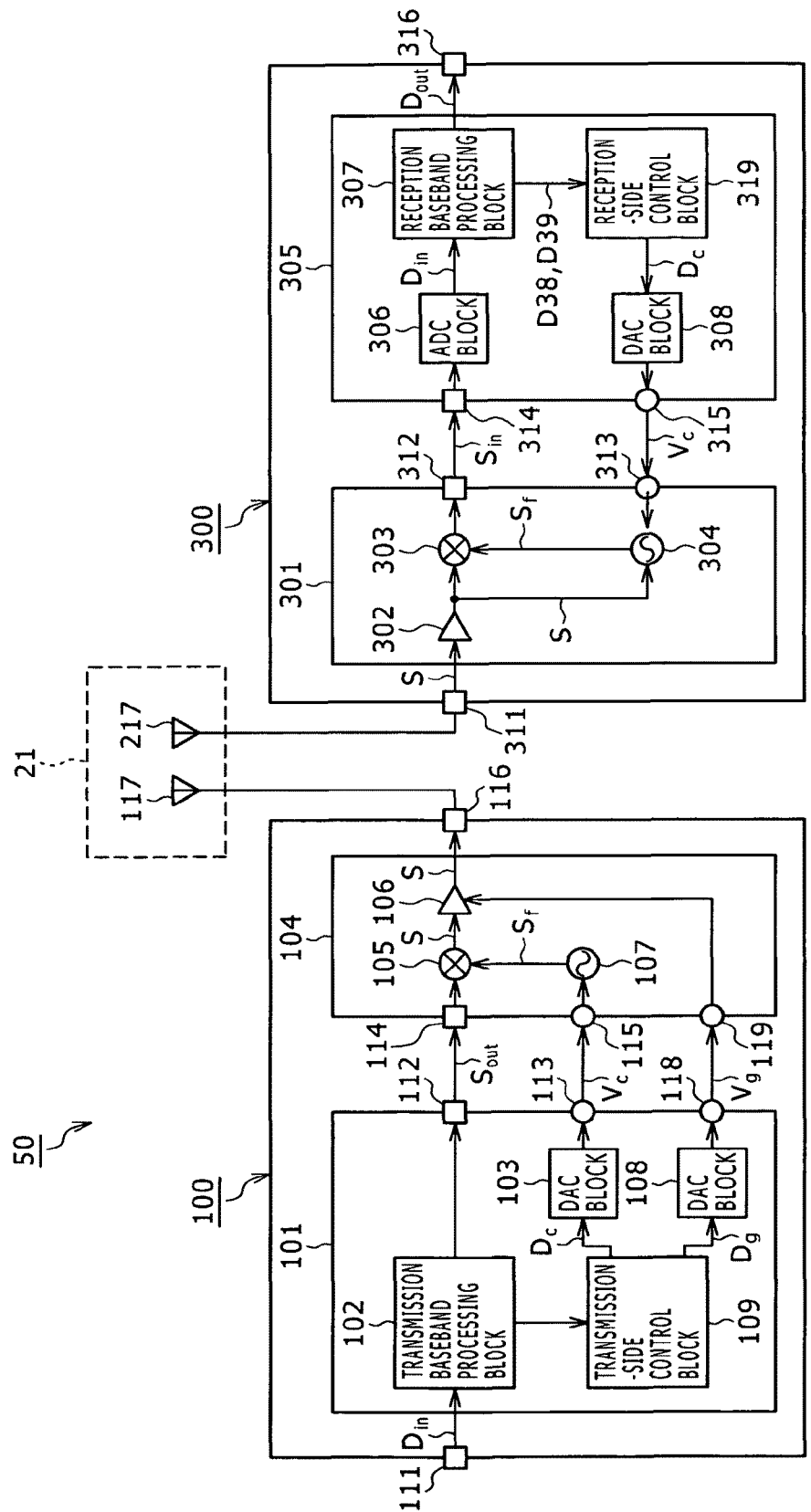
FIG. 23 is a block diagram illustrating a millimeter wave transmission system practiced as a fifth embodiment of the invention.

The following describes an exemplary configuration of a millimeter-wave transmission system 50 practiced as a fifth embodiment of the invention with reference to FIG. 23. In the fifth embodiment, the millimeter-wave transmission system 50 has the wireless transmission apparatus 100 shown in FIG. 2 and the wireless reception apparatus 300 shown in FIG. 21 that communicate with each other on a one-to-one basis.

The millimeter-wave transmission system 50 shown in FIG. 23 configures another example of a wireless communication system, in which the wireless transmission apparatus 100 shown in FIG. 2 and the wireless reception apparatus 300 shown in FIG. 21 communicate with each other on a one-to-one basis. The wireless transmission apparatus 100 has a VCO block 107 that oscillates local oscillation signal Sf and modulates digital signal Din, thereby transmitting resultant modulated signal S to the reception side.

At the time of injection locking, local oscillation signal Sf having local oscillation frequency ftx is transmitted to the reception side as modulated signal S without modulation, for example. An output terminal 116 of the wireless transmission apparatus 100 is connected to an antenna member 117. The antenna member 117 is based on a patch antenna, a probe antenna (such as a dipole), a loop antenna, or a small-size aperture coupling element (such as a slot antenna), for example.

The wireless reception apparatus 300 has a VCO block 304 for oscillating local oscillation signal Sf and receives modulated signal S from the transmission side, thereby demodulating digital signal Dout. An input terminal 311 of the wireless reception apparatus 300 is connected to an antenna member 217. For the antenna member 217, one similar to that used in the wireless transmission apparatus 100 is used. For an exemplary internal configuration of the wireless transmission apparatus 100, refer to FIG. 2. For an exemplary internal configuration of the wireless reception apparatus 300, refer to FIG. 21.

As with the third embodiment, the antenna member 117 and the antenna member 217 of the transmission side and the reception side, respectively, are arranged inside an electromagnetic wave transmission media 21. As with the third embodiment, for the electromagnetic wave transmission media 21, a dielectric transmission path is used, in addition to the air or vacuum media. The dielectric transmission path is configured by a dielectric material that can transmit electromagnetic waves based on a millimeter wave signal. For the dielectric material, a glass epoxy resin having dielectric constant ∈1 is used, for example. In addition, as with the third embodiment, a member made up of acryl, urethane resin, epoxy resin, silicone, or polyimide, for example, is used.

In the millimeter-wave transmission system 50 of this example, the wireless transmission apparatus 100 injects local oscillation signal Sf of the transmission side into the VCO block 304 during training interval T1. In this example, the wireless reception apparatus 300 adjusts oscillation control voltage Vc of the VCO block 304 during training interval T1, thereby providing injection locking. A minimum value of oscillation control voltage Vc at which local oscillation signal Sf of the transmission side injected from the wireless transmission apparatus 100 matches local oscillation signal Sf of the reception side to output almost constant reception signal Sin.

At the same time, the wireless reception apparatus 300 records oscillation control voltage Vc at the time when maximum value of reception signal Sin concerned is outputted. After the injection locking, oscillation control voltage Vc at which reception signal having the maximum value recorded before is fixed. During communication interval T2 after the injection locking, the wireless transmission apparatus 100 transmits digital signal Din to the wireless reception apparatus 300 as with the third embodiment.

In this example, the VCO block 304 is controlled on the basis of digital signal Din outputted from an ADC 306, in which locking is provided between modulated signal S entered in a DOWNMIX block 303 and local oscillation signal Sf. If local oscillation frequency ftx of the transmission side and free running oscillation frequency frx of the reception side become equal to each other, phase difference Δθ may still exist.

Here, let a phase difference between modulated signal S (an injection signal) to be entered in the wireless reception block 301 and local oscillation signal Sf of the VCO block 304 be Δθ, then equation (10) below is obtained from equations (1), (7), and (8) above:

$$\omega_{inj} - \omega_0 = \Delta\omega_m \sin\Delta\varphi \quad (10)$$

$$\Delta\phi = \sin^{-1}\left(\frac{\omega_{inj} - \omega_0}{\Delta\omega_m}\right)$$

In this example, no data is superimposed with modulated signal S on the transmission side, and local oscillation signal Sf having local oscillation frequency ftx is transmitted as modulated signal S without modulation, so that, if there exists phase difference Δθ, an almost constant value is outputted from a DOWNMIX block 303 as shown in equation (11) below:

$$\text{Sin} = x(t)e^{j(2\pi f_{tx})} \cdot e^{-j(2\pi f_{tx}t+\theta)} \quad (11)$$
$$= x(t)e^{-j\theta}$$

Also, an output value of digital signal Din outputted from the ADC 306 varies in accordance with phase difference Δθ. If there is no phase difference Δθ, no maximum value of digital signal Din is outputted as described above. Therefore, by processing, in the reception processing block 305, digital signal Din outputted from the ADC 306, free running oscillation frequency frx of the VCO block 304 may be fixed with oscillation control voltage Vc at the time when the output value of the reception processing block 305 is maximized.

Figure 24:
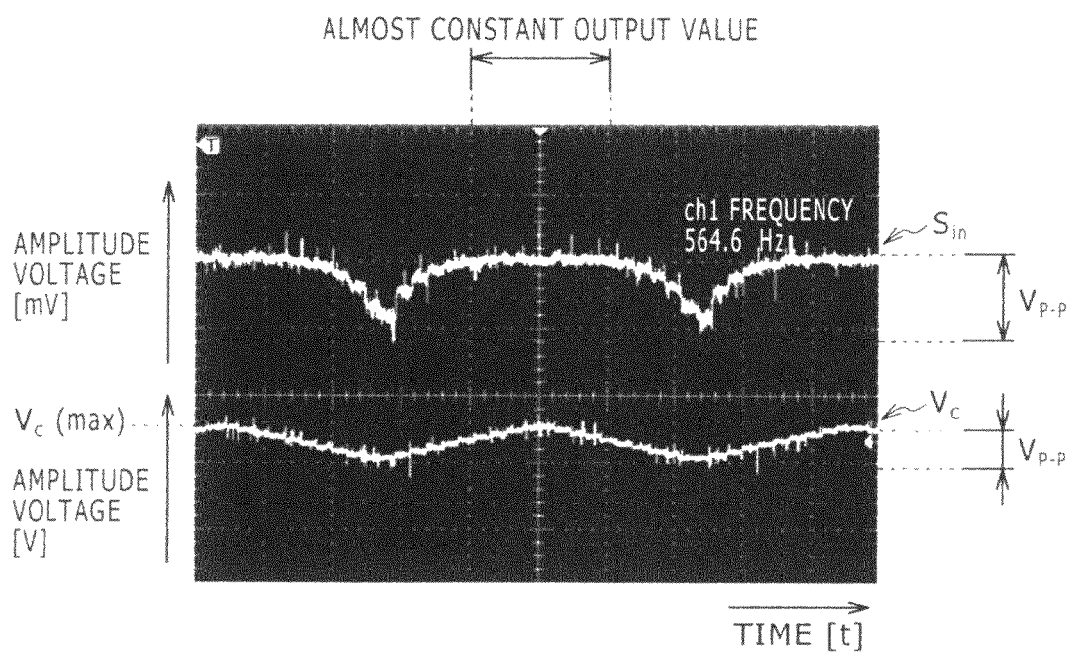
FIG. 24 is a diagram illustrating exemplary output waveforms of oscillation control voltage Vc and reception signal Sin.

The following describes an output example of oscillation control voltage Vc and reception signal Sin obtained on the basis of an injection locking experiment with reference to FIG. 24. In FIG. 24, the horizontal axis is representative of time t and the vertical axis is representative of the amplitude (or voltage) of each of oscillation control voltage Vc and reception signal Sin. Oscillation control voltage Vc is around 2.00 V at VP-P and reception signal Sin is around 200 mV at VP-P.

The output waveform example shown in FIG. 24 shows reception signal Sin outputted from the DOWNMIX block 303 when oscillation control voltage Vc of the VCO block 304 of the wireless reception apparatus 300 shown in FIG. 21 is varied by outputting only local oscillation signal Sf from the wireless transmission apparatus 100 shown in FIG. 2. The vibratory waveform line shown in the upper half of the figure is indicative of reception signal Sin outputted from the DOWNMIX block 303. Reception signal Sin is analog-to-digital converted by the ADC 306 into digital signal Sin. The waveform line shown in the lower half of the figure is indicative of oscillation control voltage Vc outputted from the VCO block 304.

In the experiment of injection locking, analog reception signal Sin outputted from the DOWNMIX block 303 was observed on an oscilloscope in place of digital signal Din outputted from the ADC 306.

In this experiment, oscillation control voltage Vc of the VCO block 304 was varied in a range in which injection locking can be provided. Observation of the output of reception signal Sin outputted from the DOWNMIX block 303 indicates a variation in the output value of reception signal Sin because of the existence of phase difference Δθ also in the locked state. Therefore, as described before, phase difference Δθ can be minimized by fixing, to the VCO block 304, oscillation control voltage Vc at the time at which the output value of digital signal Din outputted from the ADC 306 has been maximized.

In this example, for digital signal Din outputted from the ADC 306, a signal of frequency difference f∈ between local oscillation frequency ftx of the VCO block 107 of the wireless transmission apparatus 100 and free running oscillation frequency frx of the VCO block 304 of the wireless reception apparatus 300 appears as indicated by equations (10) and (11) shown above. Therefore, if there is a match between local oscillation frequency ftx and free running oscillation frequency frx of the wireless transmission apparatus 100 and the wireless reception apparatus 300, respectively, a constant value is outputted from the ADC 306, thereby allowing confirmation that locking has been provided between the oscillation frequencies of the wireless transmission apparatus 100 and the wireless reception apparatus 300.

Consequently, the injection locking processing is executed also in an environment where an oscillation frequency range changes due to the variation of temperature environment for example. In addition, locking can be provided at high speeds between local oscillation frequency ftx of local oscillation signal Sf of the wireless transmission apparatus 100 and free running oscillation frequency frx of the wireless reception apparatus 300.

Figure 25:
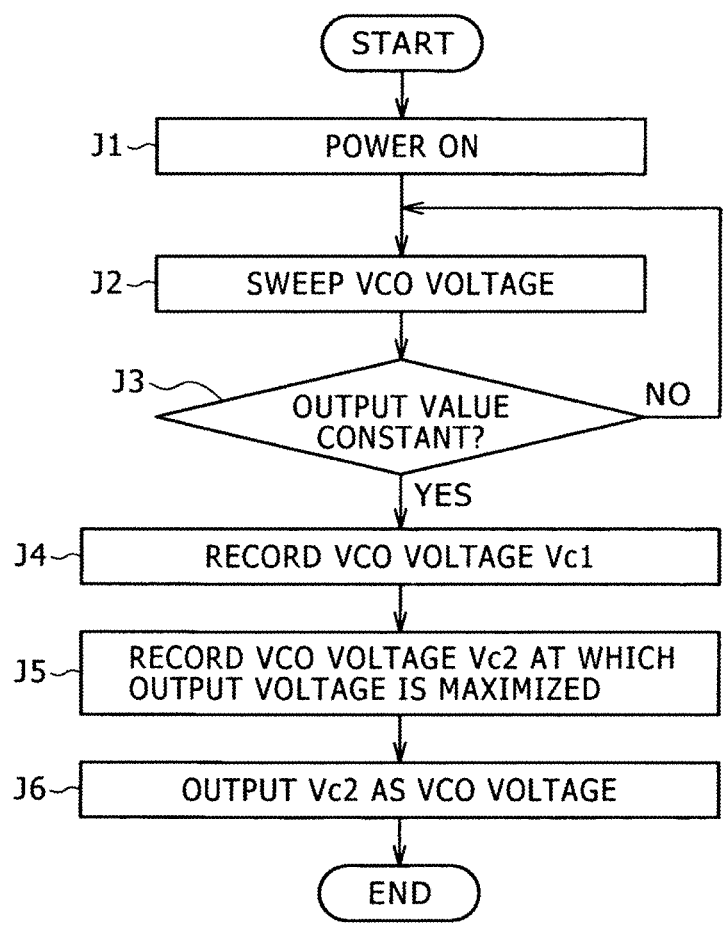
FIG. 25 is a flowchart indicative of exemplary injection locking control in the millimeter wave transmission system.

The following describes an injection locking control example in the millimeter-wave transmission system 50 with reference to FIG. 25. In this example, local oscillation signal Sf is transmitted from the wireless transmission apparatus 100 to the reception side without modulation, in which the wireless reception apparatus 300 adjusts free running oscillation frequency frx of the VCO block 204 on the basis of output value constant detection processing of digital signal Din outputted from the ADC 306. In the injection locking control at this moment, locking is provided in a state of the free running oscillation frequency frx with an output value of digital signal Din becomes constant.

Under this control condition, upon detection of power ON information in step J1 shown in FIG. 25, the reception processing block 305 moves to step J2 to adjust oscillation control voltage Vc (VCO voltage), thereby executing sweep processing. At this moment, the reception processing block 305 sets oscillation control voltage Vc of the VCO block 304 to the lower limit value to raise oscillation control voltage Vc therefrom.

Because local oscillation signal Sf having local oscillation frequency ftx is transmitted unmodulated from the wireless transmission apparatus 100 to the reception side as modulated signal S having with the amplitude having an almost constant value, almost constant digital signal Din should be received by the wireless reception apparatus 300 if injection locking is provided. The reception processing block 305 gets digital signal Din based on modulated signal S while adjusting free running oscillation frequency frx. In the state where no locking is provided, reception signal Sin becomes a signal that varies by a difference frequency between local oscillation frequency ftx and free running oscillation frequency frx, the reception processing block 305 may not get almost constant digital signal Din, thereby continuing the adjustment of free running oscillation frequency frx.

When there occurs a match between local oscillation signal Sf of the transmission side injected from the wireless transmission apparatus 100 and local oscillation signal Sf of the reception side, the variation in the output value of digital signal Din is minimized to almost constant. In step J3, the reception processing block 305 executes detection processing to detect that the output value of digital signal Din becomes constant, thereby determining whether injection locking has been provided, upon which control is branched. In this processing, the reception processing block 305 gets digital signal Din obtained by analog-to-digital converting reception signal Sin outputted from the wireless reception block 301. The reception processing block 305 determines whether injection locking has been provided in accordance with a variation in a certain interval of this digital signal Din.

If an event in which a variation of digital signal Din is below a predetermined value is detected for an almost constant interval, then, the reception processing block 305 moves to step J4 to determine that locking has been provided because digital signal Din having the same output value has continued. At this moment, first oscillation control voltage Vc1 is recorded as oscillation control voltage Vc (VCO voltage) at which the output value of digital signal Din becomes almost constant.

Next, the reception processing block 305 moves to step J5 to vary oscillation control voltage Vc in the proximity of first oscillation control voltage Vc1. Then, in the same manner as described above, the reception processing block 305 determines that locking has been provided when digital signal Din having the same output value continued for an almost constant interval, thereby storing, at oscillation control voltage Vc at that moment, oscillation control voltage Vc at the time of the detection of maximum digital signal Din as second oscillation control voltage Vc2.

Then, the reception processing block 305 moves to step J6 to set oscillation control data Dc so as to provide oscillation control voltage Vc=Vc2, thereby fixing oscillation control voltage Vc. Oscillation control voltage Vc is outputted from the DAC block 308 to the VCO block 304.

In this example, if local oscillation signal Sf is transmitted to the reception side as modulated signal S without modulation, and, if local oscillation frequency ftx of the wireless transmission apparatus 100 is matched with free running oscillation frequency frx of the wireless transmission apparatus 100 by injection locking, digital signal Din having an almost constant value is outputted from the ADC 306. Consequently, the wireless reception apparatus 300 can adjust free running oscillation frequency frx of the VCO block 304 by oscillation control voltage Vc based on the output value constant detection processing of digital signal Din, thereby providing injection locking between the transmission side and the reception side.

As described above, in the fifth embodiment, the millimeter-wave transmission system 50 has the wireless transmission apparatus 100 and the wireless reception apparatus 300 associated with the present invention. The reception processing block 305 has the ADC 306. In the reception processing block 305, digital signal Din outputted from the ADC 306 is processed by the reception baseband processing block 307. When local oscillation frequency ftx of the wireless transmission apparatus 100 matches free running oscillation frequency frx of the wireless reception apparatus 300, digital signal Din having an almost constant value is outputted from the ADC 306.

Therefore, the wireless reception apparatus 300 can adjust free running oscillation frequency frx of the VCO block 304 by oscillation control voltage Vc based on the output value constant detection processing of digital signal Din, thereby providing injection locking between the transmission side and the reception side. Consequently, local oscillation signal Sf of local oscillation frequency ftx can be injected in the VCO block 204 of the reception side by the injection locking by regarding the wireless transmission apparatus 100 as an external circuit. This can provide locking between local oscillation signal Sf of the wireless transmission apparatus 100 and local oscillation signal Sf of the wireless reception apparatus 300 during training interval T1.

Besides, the millimeter-wave transmission system 50 can execute injection locking processing based on the number of edges of digital signal Din. This can faithfully realize the injection locking by use of the VCO block 304 even if the local oscillation frequency range of local oscillation signal Sf fluctuates due to the manufacturing fluctuations of the wireless reception block 201 of the wireless reception apparatus 300 and the fluctuation in temperature environment, for example. In addition, because no PLL circuit for local oscillation frequency locking and no external circuit for injection locking are required any more, the circuit scale can be reduced to significantly save the power consumption.

In the above, the injection locking method that is executed at starting communication has been explained. With this method, it is possible that the frequency of reception signal Sin and free running oscillation frequency frx of the wireless reception apparatus 300, for example, collapse during communication. So, the following describes embodiments for controlling oscillation control voltage Vc after the passing of an injection locking control interval.

(7) The Sixth Embodiment

Figure 26:
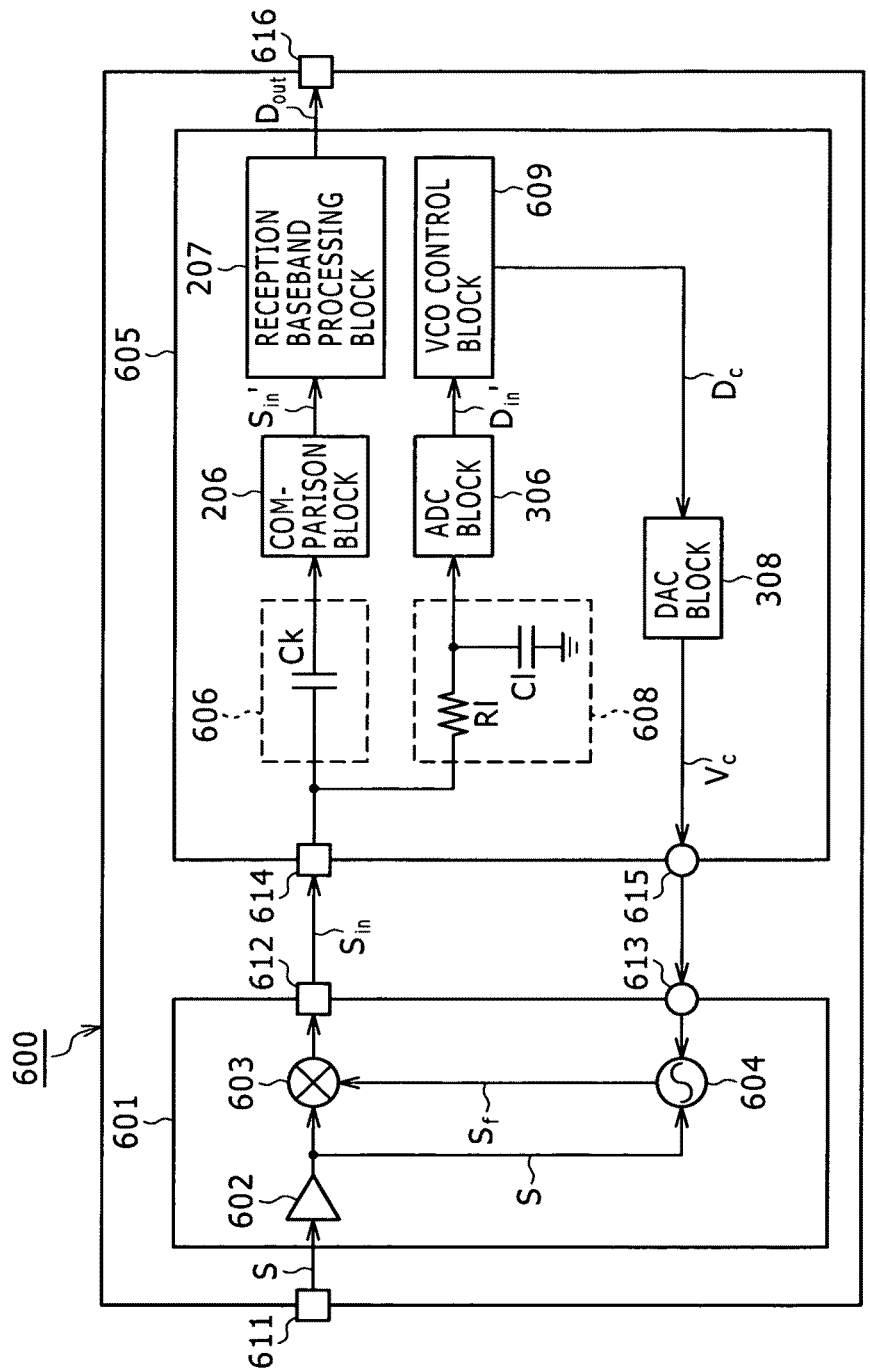
FIG. 26 is a block diagram illustrating an exemplary configuration of a wireless reception apparatus practiced as a sixth embodiment of the invention.

The following describes an exemplary configuration of a wireless reception apparatus 600 practiced as the sixth embodiment of the invention with reference to FIG. 26. In the sixth embodiment, oscillation control voltage Vc is controlled on the basis of offset voltage measuring results in a certain period of time of digital signal Din' outputted from an ADC 306 after the completion of an input locking control interval.

The wireless reception apparatus 600 shown in FIG. 26 is configured by a wireless reception block 601 and a reception processing block 605. First, the wireless reception block 601 adjusts free running oscillation frequency frx of local oscillation signal Sf concerned so as to match modulated signal S having local oscillation frequency ftx injection from the transmission side with local oscillation signal Sf of the reception side during training interval T1, thereby providing injection locking. Next, the wireless reception block 601 receives digital signal Din from the transmission side during the communication interval after the injection locking.

The wireless reception block 601 is configured by an LNA block 602, a DOWNMIX block 603, and a VCO block 604. In addition to these component blocks, the wireless reception block 601 has input terminals 611 and 613 and an output terminal 612. The wireless reception block 601 receives modulated signal S (the electromagnetic wave based on millimeter wave) from the transmission side via an antenna member, not shown and modulates digital signal Din on the basis of local oscillation signal Sf oscillated by the VCO block 604.

The input terminal 611 is connected to the antenna member, not shown, and the LNA block 602. The LNA block 602 amplifies modulated signal S received from the transmission side. The LNA block 602 is connected to the DOWNMIX block 603 and the VCO block 604. The VCO block 604 oscillates local oscillation signal Sf having free running oscillation frequency frx on the basis of oscillation control voltage Vc. From modulated signal S amplified by the LNA, the block DOWNMIX block 603 demodulates reception signal Sin on the basis of local oscillation signal Sf of the VCO block 604 controlled by a DAC block 308 of the reception processing block 605.

The above-mentioned 612 of the wireless reception block 601 is connected to the reception processing block 605. The reception processing block 605 digitally processes reception signal Sin outputted from the wireless reception block 601 to output digital signal Dout. The reception processing block 605 is configured by a comparison block 206, a reception baseband processing block 207, an ADC 306, a DAC block 308, a highpass filter 606, a lowpass filter 608, and a VCO control block 609. In addition to these component blocks, the reception processing block 605 has an input terminal 614 and output terminals 615 and 616. The above-mentioned output terminal 612 is connected to the input terminal 614 of the reception processing block 605.

The highpass filter 606 is connected between the wireless reception block 601 and the comparison block 206 via the output terminal 612 and the input terminal 614, thereby passing the high frequency component of reception signal Sin outputted from the DOWNMIX block 603. The highpass filter 606 is connected to the comparison block 206. For the highpass filter 606, capacitor Ck of around several pF is used.

In this example, the comparison block 206 outputs binary reception signal Sin' obtained by binarizing the high frequency component of reception signal Sin outputted from the DOWNMIX block 603 of the wireless reception block 601 to the reception baseband processing block 207. The reception baseband processing block 207 demodulates digital signal Dout by processing binary reception signal Sin' and outputs demodulated digital signal Dout to a higher digital processing block via the output terminal 616.

The input terminal 614 is connected to the lowpass filter 608 in addition to the highpass filter 606. The lowpass filter 608 is connected between the wireless reception block 601 and the ADC 306 and passes the low frequency component (the direct current component) of reception signal Sin outputted from the DOWNMIX block 603. For the lowpass filter 608, capacitor C1 of around several pF and resistor R1 of around several tens kΩ are used.

The lowpass filter 608 is connected to the ADC 306. The ADC 306 analog-to-digital converts the low frequency component of reception signal Sin outputted from the wireless reception block 601 to output resultant digital signal Din' (the direct current component). The ADC 306 is connected to the VCO control block 609. The VCO control block 609 generates oscillation control data Dc on the basis of digital signal Din' outputted from the ADC 306 to output resultant oscillation control data Dc to the DAC block 308.

The VCO control block 609 is connected to the DAC block 308. The DAC block 308 converts oscillation control data Dc outputted from the VCO control block 609 into analog oscillation control voltage Vc. The above-mentioned output terminal 615 of the reception processing block 605 is connected to the input terminal 613 of the wireless reception block 601. Oscillation control voltage Vc is outputted (or fed back) to the VCO block 604 via the output terminal 615 and the input terminal 613.

In this example, in order to provide injection locking, the VCO control block 609 controls the output of the VCO block 604 on the basis of oscillation control voltage Vc outputted from the DAC block 308 also during communication interval T2. For example, the VCO control block 609 executes amplitude maximum value detection processing during training interval T1 and adjusts oscillation control voltage Vc of the VCO block 604 on the basis of this detection processing to provide injection locking, thereby fixing oscillation control voltage Vc after the injection locking control interval.

As described above, in this example, if phase difference Δφ exists between modulated signal S from the transmission side entered into the DOWNMIX block 603 and local oscillation signal Sf of free running oscillation frequency frx, then the output value varies in accordance with this phase difference Δφ. This is because an offset voltage varies in accordance with phase difference Δφ also in the state with data superimposed. Therefore, during communication, a phase shift can be corrected by observing the offset voltage from time to time.

Figure 27:
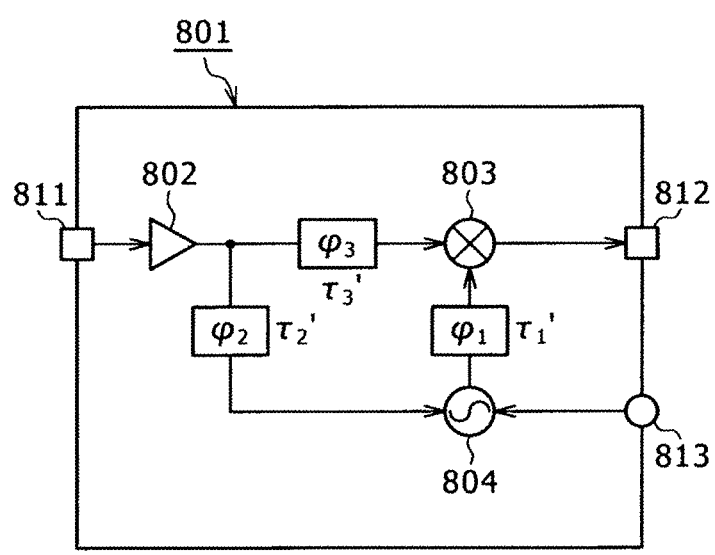
FIG. 27 is a block diagram illustrating an exemplary distribution of phase difference Δφ in a wireless reception block.

The following describes a distribution example of phase difference $\Delta\phi$ with reference to an exemplary configuration of a wireless reception block 801 shown in FIG. 27. According to the wireless communication block 801 shown in FIG. 27, phase difference $\Delta\phi=\phi1$ (first delay time $\tau1'$) is distributed on the route between a VCO 804 and a DOWNMIX block 803. Phase difference $\Delta\phi=\phi2$ (second delay time $\tau2'$) is distributed on the route between an LNA block and the VCO block 804. Phase difference $\Delta\phi=\phi3$ (third delay time $\tau3'$) is distributed on the route between the LNA block and the DOWNMIX block 803.

Therefore, to phase difference $\Delta\phi$ between local oscillation signal Sf of the transmission side and local oscillation signal Sf of the wireless reception apparatus 600, the above-mentioned phase differences $\Delta\phi=\phi1$, $\phi2$, $\phi3$ are added. As a result, reception signal Sin outputted from the DOWNMIX block 803 is influenced by all of these phase differences $\Delta\phi=\phi1$, $\phi2$, $\phi3$. In this example, the variation in reception signal Sin outputted from the DOWNMIX block 803 also depends on individual devices, so that some mechanism is required to adjust phase difference $\Delta\phi$ on the basis of the low frequency component information of reception signal Sin outputted from the DOWNMIX block 803.

Therefore, with the wireless reception apparatus 600 shown in FIG. 26, The VCO control block 609 measures a first offset voltage obtained when reception signal Sin is received from the wireless transmission apparatus 100 to compute an average value of the offset voltage concerned during a first sampling interval after the injection locking control interval. Further, the VCO control block 609 measures a second offset voltage obtained by receiving reception signal Sin during a second sampling interval after the passing of the first sampling interval to compute an average value of the offset voltage concerned.

The VCO control block 609 adjusts oscillation control voltage Vc of the VCO block 604 such that the average value of the first offset measured during the first sampling interval and the average value of the second offset voltage measuring during the second sampling interval become equal to each other. The control (or the injection locking) for adjusting this oscillation control voltage Vc of the VCO block 604 is also continued during communication interval T2 after the injection locking control interval.

Configuring the wireless reception block 601 and the reception processing block 605 as described above allows the outputting of oscillation control voltage Vc of multiple steps from the DAC block 308 to the VCO block 604, thereby controlling the output of the VCO block 604 on the basis of oscillation control voltage Vc also after the injection locking. As a result, a state in which free running oscillation frequency frx of local oscillation signal Sf of the wireless reception apparatus 600 concerned is injected in local oscillation frequency ftx of local oscillation signal Sf of the transmission side for locking can be maintained during communication interval T2.

Figure 28:
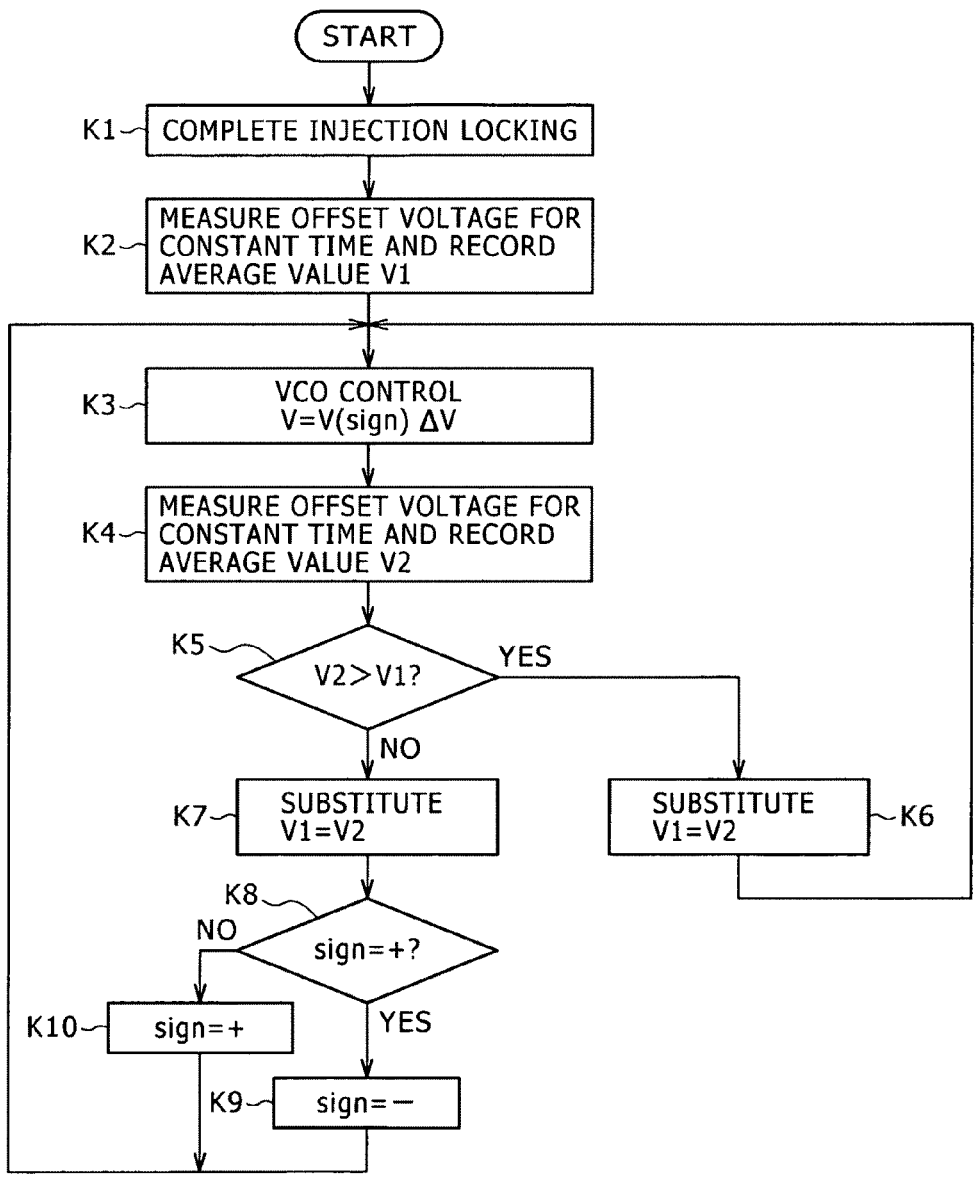
FIG. 28 is a flowchart indicative of exemplary control of a VCO block after injection locking in the wireless reception apparatus.

The following describes a control example of the VCO block 604 after injection locking in the wireless reception apparatus 600 with reference to FIG. 28. In this example, the VCO control block 609 data-processes digital signal Din' outputted from the ADC 306 as an offset voltage and outputs oscillation control data Dc obtained by this data processing to the DAC block 308. The VCO control block 609 outputs oscillation control voltage Vc from the DAC block 308 to the VCO block 604 to execute feedback control so as to adjust free running oscillation frequency frx. Voltage variation $\Delta V$ described with reference to the fifth embodiment is defined as a variation width of oscillation control voltage Vc. In addition, the variation direction of oscillation control voltage Vc is defined by sign as with the fifth embodiment, the sign taking "+" or "−".

Under this control condition, upon locking (or after completion of injection locking) between local oscillation frequency ftx of the transmission side and free running oscillation frequency frx of the wireless reception apparatus 600 by injection locking processing in step K1 shown in FIG. 28, the VCO control block 609 moves to step K2. The VCO control block 609 receives reception signal Sin from the wireless transmission apparatus 100 during a first sampling interval a certain time after the completion of injection locking. In this processing, the VCO control block 609 measures the first offset voltage based on digital signal Din' obtained from the ADC 306 to compute average value V1 of the offset voltage concerned. The VCO control block 609 records obtained offset voltage average value V1 to a nonvolatile memory for example, not shown.

Next, in step K3, the VCO control block 609 changes oscillation control voltage Vc of the VCO block 604 by sign $\Delta V$ from the current value. Oscillation control voltage Vc is shifted from the current value by $+\Delta V$. During the second sampling interval a certain time after the first sampling interval, the VCO control block 609 measures the second offset voltage based on digital signal Din' obtained from the ADC 306 in step K4 again to compute average value V2 of the offset voltage concerned. The VCO control block 609 records average value V2 of the offset voltage to the nonvolatile memory for example, not shown.

Then, in step K5, the VCO control block 609 compares the first average value V1 and the second average value V2 with each other associated with oscillation control voltage Vc. If average value V2 is found greater than average value V1 (V2>V1), then the VCO control block 609 determines that there is a match between the variation direction of oscillation control voltage Vc of the VCO block 604 and the variation direction in phase of free running oscillation frequency frx of the wireless reception apparatus 600. If V2>V1, then the VCO control block 609 moves to step K6.

In step K6, in preparation for the subsequent steps, the VCO control block 609 records average value V2 to the nonvolatile memory for example, not shown, as average value V1 of the first offset voltage measured during the first sampling interval.

Without changing the sign of oscillation control voltage Vc from the current value, namely, leaving the sign as it is, the VCO control block 609 returns to step K3 to change oscillation control voltage Vc by sign $\Delta V$. The VCO control block 609 repeats this loop processing to adjust oscillation control voltage Vc of the VCO block 604.

In step K5, the VCO control block 609 also compares average value V1 and average value V2 with each other with respect to oscillation control voltage Vc. If average value V2 is found equal to or smaller than average value V1 (V2≤V1), then the VCO control block 609 determines that the variation direction of oscillation control voltage Vc of the VCO block 604 and the variation direction in phase of free running oscillation frequency frx of the wireless reception apparatus 600 are opposite to each other. If V2≤V1, as a result of this determination, then the VCO control block 609 moves to step K7.

In step K7, in preparation for the subsequent steps, the VCO control block 609 records V2 to the nonvolatile memory for example, not shown, as average value V1 of the first offset voltage measured during the first sampling interval. At this moment, if the sign is "+", the VCO control block 609 moves to step K9 to invert the sign to "−".

If the sign is "−" in step K8, then the VCO control block 609 moves to step K10 to invert the sign to "+". Then, the VCO control block 609 returns to step K3 to change oscillation control voltage Vc of the VCO block 604 from the current value by sign ΔV. Then, the VCO control block 609 repeats this loop processing. Repeating the loop processing allows the execution feedback control that typically maximizes phase difference Δϕ. In the above-mentioned example, voltage variation ΔV is assumed constant; however, it is also practicable to use a function with the variation width of the output voltage of the ADC 306 as a variation.

Variation 1

Figure 29:
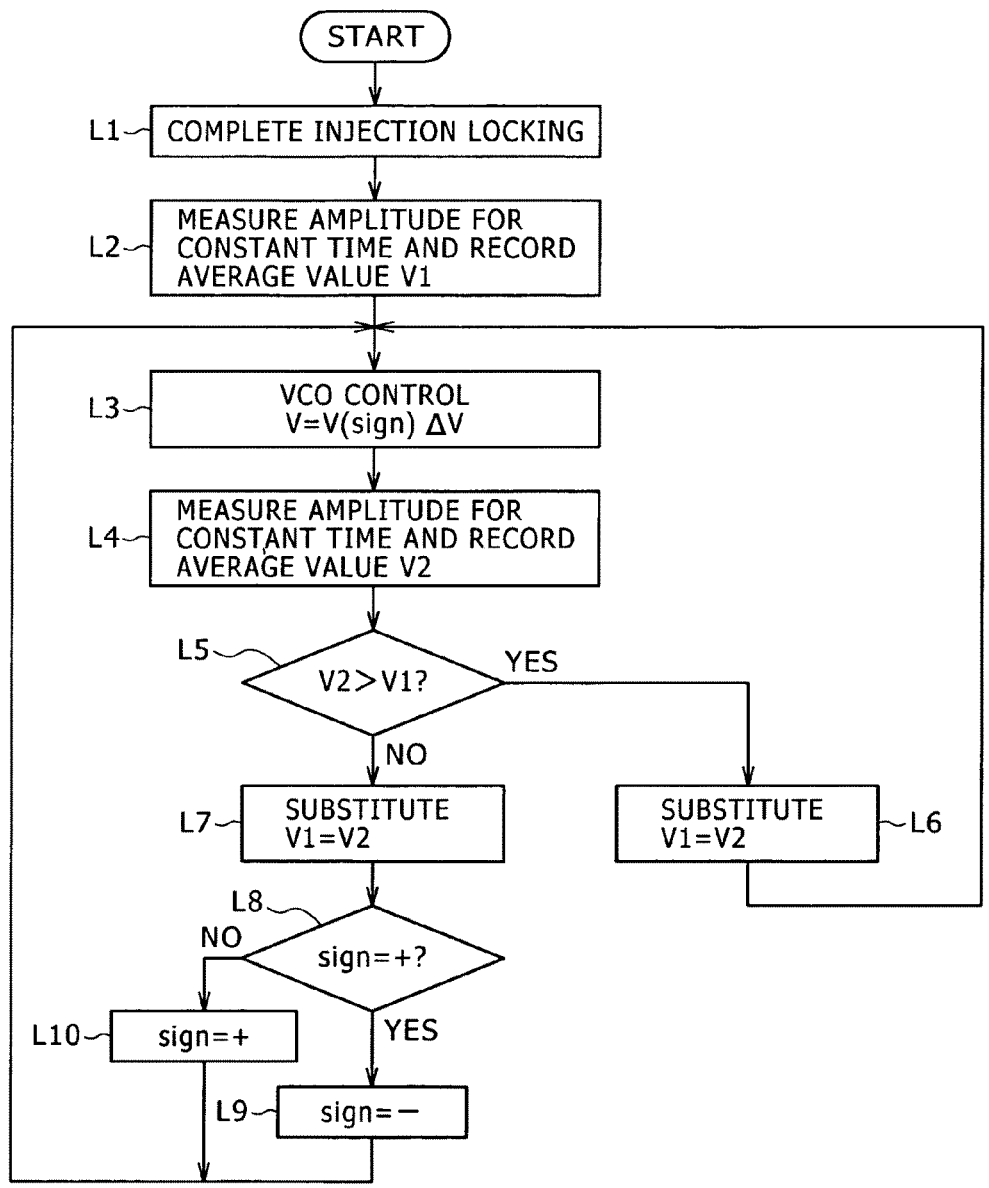
FIG. 29 is a flowchart indicative of exemplary control of the VCO block practiced as a first variation after injection locking in the wireless reception apparatus.

The following describes a control example of the VCO block 304 as a first variation after injection locking in the wireless reception apparatus 300 with reference to FIG. 29. From equation (5) described above, this example uses the maximizing of the amplitude voltage of reception signal Sin outputted from the DOWNMIX block 303 when phase difference Δϕ between modulated signal S injected from the transmission side and local oscillation signal Sf of the wireless reception apparatus 300 disappears. Local oscillation signal Sf is a signal having free running oscillation frequency frx.

In this example, the a reception baseband processing block 307 measures the amplitude voltage of digital signal Din outputted from the ADC 306 to output resultant amplitude data D38 to the reception side control block 319. The reception side control block 319 outputs oscillation control data Dc obtained from this amplitude data D38 to the DAC block 308. The reception side control block 319 outputs oscillation control voltage Vc from the DAC block 308 to the VCO block 604 to adjust free running oscillation frequency frx, thereby executing feedback control so as to maximize the amplitude voltage of reception signal Sin.

In this variation, voltage variation ΔV described with the fifth embodiment is also defined as a variation width of oscillation control voltage Vc. Also, as with the sixth embodiment, the variation direction of oscillation control voltage Vc is defined by sign, which takes "+" or "−".

Under this control condition, upon locking (or after completion of injection locking) between local oscillation frequency ftx of the transmission side and free running oscillation frequency frx of the wireless reception apparatus 300 by injection locking processing in step L1 shown in FIG. 29, the reception side control block 319 moves to step L2. The reception side control block 319 receives reception signal Sin from the wireless transmission apparatus 100 during the first sampling interval a certain period of time after the completion of injection locking. In this processing, reception side control block 319 measures a first amplitude voltage of digital signal Din obtained from the ADC 306 to compute an average value V1 of the amplitude voltage concerned. The reception side control block 319 records the average value V1 of the amplitude voltage of digital signal Din to a nonvolatile memory for example, not shown.

Next, in step L3, the reception side control block 319 varies oscillation control voltage Vc of the VCO block 304 by sign ΔV from the current value. Then, Oscillation control voltage Vc is shifted by +ΔV from the current value. During a second sampling interval a certain period of time after the first sampling interval, the reception side control block 319 measures a second amplitude voltage of digital signal Din obtained from the ADC 306 to compute an average value V2 of the amplitude voltage concerned in step L4. The reception side control block 319 records the average value V2 of the amplitude voltage of digital signal Din to the nonvolatile memory for example, not shown.

Then, in step L5, the reception side control block 319 compares the first average value V1 associated with oscillation control voltage Vc with the second average value V2. If the average value V2 is found greater than the average value V1 (V2>V1), then the reception side control block 319 determines that there is a match between the variation direction of oscillation control voltage Vc and the variation direction of the phase of free running oscillation frequency frx of the wireless reception apparatus 600. If V2>V1 as described above, the reception side control block 319 moves to step L6.

In step L6, the reception side control block 319 records V2 to the nonvolatile memory for example, not shown, as the average value V1 of a first offset voltage measured during the first sampling interval in preparation for subsequent steps.

Without changing the sign of oscillation control voltage Vc from the current value, namely, leaving the sign as it is, the reception side control block 319 returns to step L3 to change oscillation control voltage Vc by sign 4V. The reception side control block 319 repeats this loop processing to adjust oscillation control voltage Vc of the VCO block 304.

In step L5, the reception side control block 319 also compares average value V1 and average value V2 with each other with respect to oscillation control voltage Vc. If average value V2 is found equal to or smaller than average value V1 (V2≤V1), then the reception side control block 319 determines that the variation direction of oscillation control voltage Vc of the VCO block 304 and the variation direction in phase of free running oscillation frequency frx of the wireless reception apparatus 300 are opposite to each other. If V2≤V1 as described above, as a result of this determination, then the reception side control block 319 moves to step L7.

In step L7, in preparation for the subsequent steps, the reception side control block 319 records V2 to the nonvolatile memory for example, not shown, as average value V1 of the first offset voltage measured during the first sampling interval. At this moment, if the sign is "+", the reception side control block 319 moves to step L9 to invert the sign to "−".

If the sign is "−" in step L8, then the reception side control block 319 moves to step L10 to invert the sign to "+". Then, the reception side control block 319 returns to step L3 to change oscillation control voltage Vc of the VCO block 300 from the current value by sign ΔV. Then, the reception side control block 319 repeats this loop processing. Repeating the loop processing allows the execution feedback control that typically maximizes phase difference Δϕ. In the above-mentioned example, voltage variation ΔV is assumed constant; however, it is also practicable to use a function with the variation width of the output voltage of the ADC 306 as a variation.

Embodiments of the present invention are suitably applicable to millimeter-wave transmission systems configured to fast transmit signals of the millimeter band with carrier frequencies ranging from 30 GHz to 300 GHz for carrying movie images and computer graphics images, for example, inside housing of each of the apparatuses. These apparatuses include data recording/reproducing apparatus, a terrestrial wave television receiving apparatus, a mobile phone apparatus, a game apparatus, a computer, and a communication apparatus.

The present application contains subject matter related to that disclosed in Japanese Priority Patent Application JP 2009-258369 filed in the Japan Patent Office on Nov. 11, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A wireless transmission apparatus
wherein a phenomenon in which, when a signal having a frequency in the proximity of an oscillation frequency is injected in an oscillator, the oscillation frequency of said oscillator is pulled into the frequency of the injected signal is defined as injection locking and
an interval in which injection locking is provided so as to match a signal having a local oscillation frequency of a transmission side arranged in a housing of an apparatus with a signal having a free running oscillation frequency of a reception side in said housing is defined as an injection locking control interval,
said wireless transmission apparatus comprising:
a wireless transmission block having an oscillator for oscillating a signal having said local oscillation frequency of the transmission side, said wireless transmission block being configured to transmit a digital signal on the basis of a signal having a local oscillation frequency oscillated by said oscillator to the reception side; and
a transmission processing block configured to digitally process a digital signal to output a resultant transmission signal to said wireless transmission block,
wherein during said injection locking control interval, said wireless transmission block injects a signal having said local oscillation frequency of said wireless transmission block into an oscillator of the reception side,
wherein in order to match a signal having said local oscillation frequency of said wireless transmission block injected from said wireless transmission block into said oscillator with a signal of said free running oscillation frequency of the reception side, the reception side adjusts a free running oscillation frequency of said signal of the reception side, thereby providing injection locking,
wherein after completion of said injection locking control interval, said wireless transmission block transmits a digital signal to the reception side,
wherein said transmission processing block has:
a data processing block configured to digitally process a digital signal to output resultant digital oscillation control data, and
a digital-to-analog converter configured to convert the digital oscillation control data outputted from said data processing block into an analog oscillation control signal to output a resultant signal to the oscillator,
wherein said wireless transmission block has:
a modulation block configured to modulate the transmission signal on the basis of a signal having said local oscillation signal oscillated by the oscillator to output a resultant modulated signal, and
an amplifier configured to amplify the modulated signal outputted from said modulation block,
wherein said transmission processing block controls said oscillator by the oscillation control signal outputted from said digital-to-analog converter, thereby controlling an output of said amplifier on the basis of the signal having the local oscillation frequency oscillated by said oscillator,
wherein said transmission processing block gradually increases the output of said amplifier from a normal setting level during the injection locking control interval, and
wherein after completion of the injection locking control interval, said transmission processing block returns the output of said amplifier to the normal level.

2. A wireless reception apparatus
wherein a phenomenon in which, when a signal having a frequency in the proximity of an oscillation frequency is injected in an oscillator, the oscillation frequency of said oscillator is pulled into the frequency of the injected signal is defined as injection locking and
an interval in which injection locking is provided so as to match a signal having a local oscillation frequency of a transmission side arranged in a housing of an apparatus with a signal having a free running oscillation frequency of a reception side in said housing is defined as an injection locking control interval,
said wireless reception apparatus comprising:
a wireless reception block having an oscillator for oscillating a signal having free running oscillation frequency, said wireless reception block receiving a modulated signal from the transmission side to modulate the reception signal on the basis of the signal having the free running oscillation frequency oscillated by said oscillator; wherein,
during the injection locking control interval, in order to match a signal having said local oscillation frequency of the transmission side injected from the transmission side into said oscillator with a signal of a free running oscillation frequency of the reception side to provide injection locking, said wireless reception block adjusts the oscillation frequency of the signal, and
receives a digital signal from the transmission side after completion of the injection locking control interval,
a reception processing block configured to digitally process a reception signal received from said wireless reception block to output a resultant digital signal, said reception processing block having:
an analog-to-digital conversion block configured to analog-to-digital convert a reception signal outputted from the wireless reception block;
a data processing block configured to digitally process a frequency difference and a phase difference of digital reception data outputted from said analog-to-digital conversion block to output resultant digital oscillation control data; and
a digital-to-analog converter configured to convert the digital oscillation control data outputted from said data processing block into an analog oscillation control signal;
a lowpass filter connected between said wireless reception block and said analog-to-digital conversion block, said lowpass filter being configured to pass a low frequency component of a reception signal; and
an oscillation control block configured to generate a digital-to-analog converter control voltage by taking in reception data outputting from said analog-to-digital conversion block to control an output of said digital-to-analog converter on the basis of the digital-to-analog converter control voltage.

3. The wireless reception apparatus according to claim 2, further comprising:
a reception processing block configured to digitally process a reception signal outputted from said wireless reception block to output a resultant digital signal,
said wireless reception block having a detection block configured to take in the reception signal from said wireless reception block to detect a frequency difference and a phase difference between the local oscillation frequency of the transmission side and the free running oscillation frequency of the reception side;
a data processing block configured to digitally process the detected frequency difference and phase difference outputted from said detection block to output resultant digital oscillation control data; and
a digital-to-analog converter configured to convert the digital oscillation control data outputted from said data processing block into an analog oscillation control signal.

4. The wireless reception apparatus according to claim 3, wherein said reception processing block controls the oscillation frequency of said oscillator on the basis of the analog oscillation control signal outputted from said digital-to-analog converter.

5. The wireless reception apparatus according to claim 3, wherein said wireless reception block has an amplifier configured to amplify the modulated signal received from the transmission side; and a demodulation block configured to demodulate the reception signal from the modulated signal amplified by the amplifier on the basis of the signal having the oscillation frequency of said oscillator controlled by said digital-to-analog converter of said reception processing block.

6. The wireless reception apparatus according to claim 5, wherein said reception processing block controls said oscillator by the oscillation control signal outputted from said digital-to-analog converter to control an output of said amplifier on the basis of the signal having the oscillation frequency of said oscillator.

7. The wireless reception apparatus according to claim 5, wherein said reception processing block controls said oscillator by the oscillation control signal outputted from said digital-to-analog converter to control an output of said demodulation block on the basis of the signal having the oscillation frequency of said oscillator.

8. A wireless communication system
wherein a phenomenon in which, when a signal having a frequency in the proximity of an oscillation frequency is injected in an oscillator, the oscillation frequency of said oscillator is pulled into the frequency of the injected signal is defined as injection locking and
an interval in which injection locking is provided so as to match a signal having a local oscillation frequency of a transmission side arranged in a housing of an apparatus with a signal having a free running oscillation frequency of a reception side in said housing is defined as an injection locking control interval,
said wireless communication system comprising:
a wireless transmission apparatus having an oscillator for oscillating a signal having the local oscillation frequency of the transmission side, said wireless transmission apparatus modulating a digital signal to transmit a resultant modulated digital signal; and
a wireless reception apparatus having an oscillator for oscillating a signal having a free running oscillation frequency, said wireless reception apparatus receiving the modulated digital signal from said wireless transmission apparatus to demodulate the received modulated digital signal;
during the injection locking control interval,
said wireless transmission apparatus injecting a signal having said local oscillation frequency of the transmission side into said oscillator of the reception side,
said wireless reception apparatus, in order to match the signal having the oscillation frequency of the transmission side injected from said wireless transmission apparatus with a signal having a free running oscillation frequency of the reception side, adjusting the oscillation frequency of said signal to provide injection locking, and,
after completion of the injection locking control interval, said wireless transmission apparatus transmitting a digital signal to said wireless reception apparatus,
wherein processing of demodulating and detecting a locking identification modulated signal transmitted from the transmission side is defined as syncword detection processing,
wherein processing of demodulating a digital signal transmitted from the transmission side to compute a bit error rate is defined as bit error detection processing, and
wherein processing of detecting an amplitude maximum value of a reception signal is defined as amplitude maximum value detection processing,
wherein during the injection locking control interval, said wireless reception apparatus executes at least one of the syncword detection processing, the bit error detection processing, and the amplitude maximum value detection processing and adjusts an oscillation control voltage of said oscillator to provide injection locking, and
wherein after completion of the injection locking control interval, fixes the adjusted oscillation control voltage.

9. A wireless communication system
wherein a phenomenon in which, when a signal having a frequency in the proximity of an oscillation frequency is injected in an oscillator, the oscillation frequency of said oscillator is pulled into the frequency of the injected signal is defined as injection locking and
an interval in which injection locking is provided so as to match a signal having a local oscillation frequency of a transmission side arranged in a housing of an apparatus with a signal having a free running oscillation frequency of a reception side in said housing is defined as an injection locking control interval,
said wireless communication system comprising:
a wireless transmission apparatus having an oscillator for oscillating a signal having said local oscillation frequency of the transmission side, said wireless transmission apparatus modulating a digital signal to transmit a resultant modulated digital signal; and
a wireless reception apparatus having an oscillator for oscillating a signal having a free running oscillation frequency, said wireless reception apparatus receiving the modulated digital signal from said wireless transmission apparatus to demodulate the received modulated digital signal;
during the injection locking control interval,
said wireless transmission apparatus injecting a signal having said local oscillation frequency of the transmission side into said oscillator of the reception side,
said wireless reception apparatus, in order to match the signal having the oscillation frequency of the transmission side injected from said wireless transmission apparatus with a signal having a free running oscillation frequency of the reception side, adjusting the oscillation frequency of said signal to provide injection locking, and,
after completion of the injection locking control interval, said wireless transmission apparatus transmitting a digital signal to said wireless reception apparatus,
wherein said wireless reception apparatus:

adjusts an oscillation control voltage of said oscillator to provide injection locking during the injection locking control interval, detects a first oscillation control voltage at which the signal having the local oscillation frequency of the transmission side injected from the wireless transmission apparatus matches the signal having the free running oscillation frequency of the reception side to provide an almost constant output value, detects a second oscillation control voltage at which the first oscillation control voltage starts fluctuating, computes an average value between the first oscillation control voltage and the second oscillation control voltage, and fixes an oscillation control voltage obtained by the computation after completion of the injection locking control interval.

10. A wireless communication system
wherein a phenomenon in which, when a signal having a frequency in the proximity of an oscillation frequency is injected in an oscillator, the oscillation frequency of said oscillator is pulled into the frequency of the injected signal is defined as injection locking and an interval in which injection locking is provided so as to match a signal having a local oscillation frequency of a transmission side arranged in a housing of an apparatus with a signal having a free running oscillation frequency of a reception side in said housing is defined as an injection locking control interval, said wireless communication system comprising:

a wireless transmission apparatus having an oscillator for oscillating a signal having said local oscillation frequency of the transmission side, said wireless transmission apparatus modulating a digital signal to transmit a resultant modulated digital signal; and a wireless reception apparatus having an oscillator for oscillating a signal having a free running oscillation frequency, said wireless reception apparatus receiving the modulated digital signal from said wireless transmission apparatus to demodulate the received modulated digital signal;

during the injection locking control interval, said wireless transmission apparatus injecting a signal having said local oscillation frequency of the transmission side into said oscillator of the reception side, said wireless reception apparatus, in order to match the signal having the oscillation frequency of the transmission side injected from said wireless transmission apparatus with a signal having a free running oscillation frequency of the reception side, adjusting the oscillation frequency of said signal to provide injection locking, and, after completion of the injection locking control interval, said wireless transmission apparatus transmitting a digital signal to said wireless reception apparatus, wherein said wireless reception apparatus:

adjusts an oscillation control voltage of said oscillator to provide injection locking during the injection locking control interval, detects a minimum value of the oscillation control voltage at which the signal having the local oscillation frequency of the transmission side injected from the wireless transmission apparatus matches the signal having the free running oscillation frequency of the reception side to provide an almost constant output value and, at the same time, detects a maximum value of this oscillation control voltage, compares the minimum value of the oscillation control voltage with the maximum value of the oscillation control voltage to select the maximum value of this oscillation control voltage, and fixes the oscillation control voltage of the maximum value obtained by the selection after completion of the injection locking control interval.

11. The wireless communication system according to claim 10, wherein said wireless reception apparatus:

detects a frequency difference between the signal having the local oscillation frequency of the transmission side injected from said wireless transmission apparatus and the signal having the free running oscillation frequency of the reception side during the injection locking control interval, and adjusts an oscillation control voltage of said oscillator in a direction in which the frequency difference decreases, thereby providing injection locking.

12. A wireless communication system
wherein a phenomenon in which, when a signal having a frequency in the proximity of an oscillation frequency is injected in an oscillator, the oscillation frequency of said oscillator is pulled into the frequency of the injected signal is defined as injection locking and an interval in which injection locking is provided so as to match a signal having a local oscillation frequency of a transmission side arranged in a housing of an apparatus with a signal having a free running oscillation frequency of a reception side in said housing is defined as an injection locking control interval, said wireless communication system comprising:

a wireless transmission apparatus having an oscillator for oscillating a signal having said local oscillation frequency of the transmission side, said wireless transmission apparatus modulating a digital signal to transmit a resultant modulated digital signal; and a wireless reception apparatus having an oscillator for oscillating a signal having a free running oscillation frequency, said wireless reception apparatus receiving the modulated digital signal from said wireless transmission apparatus to demodulate the received modulated digital signal;

during the injection locking control interval, said wireless transmission apparatus injecting a signal having a local oscillation frequency of the transmission side into said oscillator of the reception side, said wireless reception apparatus, in order to match the signal having the oscillation frequency of the transmission side injected from said wireless transmission apparatus with a signal having a free running oscillation frequency of the reception side, adjusting the oscillation frequency of said signal to provide injection locking, and, after completion of the injection locking control interval, said wireless transmission apparatus transmitting a digital signal to said wireless reception apparatus, wherein said wireless reception apparatus:

measures a first offset voltage obtained when a reception signal is received from said wireless transmission apparatus to compute an average value of the first offset voltage during a first sampling interval after the completion of the injection locking control interval, measures a second offset voltage obtained when a reception signal is received during a second sampling interval after passing of the first sampling interval to compute an average value of the second offset voltage, and adjusts an oscillation control voltage of said oscillator such that the average value of the first offset voltage measured in the first sampling interval and the average value of the second offset voltage measured in the second sampling interval become equal to each other.

13. A wireless communication system
wherein a phenomenon in which, when a signal having a frequency in the proximity of an oscillation frequency is injected in an oscillator, the oscillation frequency of said oscillator is pulled into the frequency of the injected signal is defined as injection locking and
an interval in which injection locking is provided so as to match a signal having a local oscillation frequency of a transmission side arranged in a housing of an apparatus with a signal having a free running oscillation frequency of a reception side in said housing is defined as an injection locking control interval,
said wireless communication system comprising:
a wireless transmission apparatus having an oscillator for oscillating a signal having said local oscillation frequency of the transmission side, said wireless transmission apparatus modulating a digital signal to transmit a resultant modulated digital signal; and
a wireless reception apparatus having an oscillator for oscillating a signal having a free running oscillation frequency, said wireless reception apparatus receiving the modulated digital signal from said wireless transmission apparatus to demodulate the received modulated digital signal;
during the injection locking control interval,
said wireless transmission apparatus injecting a signal having a local oscillation frequency of the transmission side into said oscillator of the reception side,
said wireless reception apparatus, in order to match the signal having the oscillation frequency of the transmission side injected from said wireless transmission apparatus with a signal having a free running oscillation frequency of the reception side, adjusting the oscillation frequency of said signal to provide injection locking, and,
after completion of the injection locking control interval, said wireless transmission apparatus transmitting a digital signal to said wireless reception apparatus,
wherein said wireless reception apparatus:
measures an amplitude of a reception signal received from said wireless transmission apparatus to compute an average value a first amplitude during a first sampling interval after the completion of the injection locking control interval,
measures an amplitude of a reception signal received during a second sampling interval after passing of the first sampling interval to compute an average value of a second amplitude, and
adjusts an oscillation control voltage of said oscillator such that the average value of the first amplitude measured during the first sampling interval and the average value of the second amplitude measured during the second sampling interval become equal to each other.

* * * * *